(12) United States Patent
de Goumoëns et al.

(10) Patent No.: US 12,474,785 B2
(45) Date of Patent: Nov. 18, 2025

(54) SMART KEY CAP WITH TRANSCEIVER

(71) Applicant: Logitech Europe S.A., Lausanne (CH)

(72) Inventors: Frédéric Alexis Guillaume de Goumoëns, Vaud (CH); Jan Stoeckli, Jongny (CH); Jean-Claude Dunant, Fey (CH)

(73) Assignee: Logitech Europe S.A, Lausanne (CH)

( * ) Notice: Subject to any disclaimer, the term of this patent is extended or adjusted under 35 U.S.C. 154(b) by 150 days.

(21) Appl. No.: 17/985,018

(22) Filed: Nov. 10, 2022

(65) Prior Publication Data

US 2023/0152903 A1   May 18, 2023

Related U.S. Application Data

(60) Provisional application No. 63/279,829, filed on Nov. 16, 2021.

(51) Int. Cl.
*G06F 3/02* (2006.01)
*G06F 3/01* (2006.01)
*G06F 3/023* (2006.01)
*G06K 19/077* (2006.01)
*H01H 9/16* (2006.01)
*H01H 9/54* (2006.01)
(Continued)

(52) U.S. Cl.
CPC ......... *G06F 3/021* (2013.01); *H01H 13/7057* (2013.01)

(58) Field of Classification Search
CPC .......................... G07C 9/00563; G06F 3/0202
See application file for complete search history.

(56) References Cited

U.S. PATENT DOCUMENTS

| 7,157,651 B2 | 1/2007 | Rix et al. |
| 7,315,908 B2 * | 1/2008 | Anderson ............. G06F 3/02 710/72 |

(Continued)

FOREIGN PATENT DOCUMENTS

| CN | 2327004 Y | 6/1999 |
| CN | 113257601 A | 8/2021 |
| JP | 2008059190 A | 3/2008 |

OTHER PUBLICATIONS

Ergodex DX1, pulled from the Internet on Nov. 10, 2022 URL: https://deskthority.net/viewtopic.php?t=3213, Jul. 8, 2012, Deskthority, mechanical keyboard authority, 6 pages.

(Continued)

*Primary Examiner* — Getente A Yimer
(74) *Attorney, Agent, or Firm* — Kilpatrick Townsend & Stockton LLP

(57) ABSTRACT

A keyboard system comprises a housing and a key structure having a key body and key cap. The key body includes a transceiver circuit. The key cap includes a key cap transceiver and a memory structure storing a key cap ID data and/or a key function data corresponding to a key function. The transceiver circuit can poll the key cap memory via the key cap transceiver and retrieve the key cap ID data and/or the key function data. The keyboard system can determine a mapping of a location of the key cap on the keyboard by polling it and can generate and transmit a control signal to a host computing device communicatively coupled to the keyboard system based to the key cap ID and/or the key function data.

20 Claims, 14 Drawing Sheets

(51) Int. Cl.
*H01H 13/02* (2006.01)
*H01H 13/14* (2006.01)
*H01H 13/705* (2006.01)
*H01H 13/7057* (2006.01)
*H01H 13/7065* (2006.01)
*H01H 13/83* (2006.01)

(56) References Cited

U.S. PATENT DOCUMENTS

| | | | |
|---|---|---|---|
| 2011/0115652 A1* | 5/2011 | Werner | G06F 3/0202 341/24 |
| 2017/0053467 A1* | 2/2017 | Meganck | G07C 9/00563 |
| 2017/0228123 A1* | 8/2017 | Ghassabian | G06F 3/0236 |
| 2017/0278313 A1* | 9/2017 | Maslar | G07C 5/0841 |

OTHER PUBLICATIONS

Youtube, pulled from the Internet on Nov. 10, 2022 URL: https://www.youtube.com/watch?v=9klDrR6Uabl, Dec. 18, 2020, Ergodex DX1 review (single key module things), 4 pages.

* cited by examiner smart key cap bottom view

SMART KEY CAP WITH TRANSCEIVER

CROSS-REFERENCES PARAGRAPH FOR RELATED APPLICATIONS

This application is a non-provisional application and claims the benefit and priority of U.S. Provisional Application No. 63/279,829, filed on Nov. 16, 2021, and titled "SMART KEY CAP WITH TRANSCEIVER," which is hereby incorporated by reference in its entirety for all purposes.

BACKGROUND

Input devices such as keyboards or key-based computer peripheral devices remain a popular and effective user interface between human and computer. Keyboards have evolved and improved over the years in quality, function, ergonomics, and longevity. Modern keyboards often include number pads, function keys, media keys, and many other key functions in any number of different configurations. Despite the many configurations and options available to consumers, keyboards are often locked into particular key arrangements and corresponding functions. As such, users may resort to buying multiple keyboard devices to better accommodate particular applications, which can be costly and wasteful. Better solutions are needed.

BRIEF SUMMARY

In some embodiments, a keyboard system comprises: a housing; a key structure disposed in the housing, the key structure including: a key body including a transceiver circuit; and a key cap configured to be non-destructively coupled to and decoupled from the key body, wherein the key cap includes: a transceiver circuit; and a memory structure storing: a key cap identification (ID) data; and a key function data corresponding to a key function, wherein the transceiver circuit is configured to poll the key cap memory structure via the transceiver circuit when the key cap is coupled to the key body and retrieve the key cap ID data and the key function data, and wherein the keyboard system is configured to: determine a location of the key cap on the keyboard based on the polling of the key cap; and generate and transmit a control signal to a host computing device communicatively coupled to the keyboard system, the control signal corresponding to the key cap ID data and key function data. In some embodiments, the key body includes a key switch with a key cap interface configured to couple to the key cap via at least one of a friction fit, magnetic coupling, or hardware coupling. The key structure can further comprise: a key cap holder configured between the key cap and the key body, the key cap holder configured to couple the key body to the key cap. In some aspects, the keyboard system includes a plurality of key structures each having corresponding key caps, and wherein the transceiver circuit includes: one or more processors; and a global transceiver structure configured under the plurality of key structures within the housing, the transceiver circuit configured to poll each transceiver circuit in the corresponding key caps of the plurality of key structures via the global transceiver structure. In some embodiments, the key structure includes a local transceiver circuit configured within or adjacent to the key body, wherein the transceiver circuit is coupled to and controlled by one or more processors configured within the housing, and wherein the transceiver circuit is configured to poll the transceiver circuit in the key cap via the local transceiver. In some embodiments, the control signal is one of a human interface device (HID)-formatted control signal or a proprietary command configured for use with computer peripheral devices. In certain embodiments, the transceiver circuit is configured to poll the key cap memory structure when the key cap is pressed. In certain cases, the transceiver circuit is configured to poll the key cap memory structure when the key cap is unpressed at any time in order to detect a modified key cap ID data or a modified key function data. The transceiver circuit may be operable to modify the data stored in the memory structure of the key cap. The transceiver circuit can communicate with the key cap via one of RF, inductive, magnetic, or optical-based communication. In certain embodiments, the transceiver circuit is configured to poll the key cap memory structure when an electrical circuit is closed by way of corresponding key press event of the key structure. In some cases, a key cap may be determined to be pressed via a pressure-based detection scheme including at least one of an internal switching mechanism or a force sensitive resistor, or via a distance-based detection scheme based on a detection threshold. In certain embodiments, the key function can include at least one of an alphanumeric character, symbol, emoji, media function, gaming function, shortcut, macro function, editing keys, navigation functions, sensor data, and clicking functions.

In certain embodiments, a key cap for a key structure of an input device comprises: a transceiver circuit; and a memory structure operable to store: a key cap identification (ID) data; and a key function data corresponding to a key function, wherein the key cap is configured to be coupled to a key body, wherein the key cap is operable to communicate with a transceiver circuit in the key body via the transceiver circuit, wherein the key cap is configured to transmit the key cap ID data and key function data to the transceiver circuit via the transceiver circuit, and wherein the key cap is operable to instantiate the key function in a host computing device coupled to the input device when the key cap is depressed. In some aspects, the key cap ID data and key function data is configured to cause an input device to generate and transmit a control signal to a host computing device communicatively coupled to the input device, the control signal operable to control the host computing device based on the key cap ID data and key function data. In some cases, the control signal controls the host computing device by causing the host computing device to: update a visual representation of the input device on a display controlled by the host computing device, the visual representation of the input device including: a virtual input device with a virtual key cap; an editable data field that displays the key cap ID data of the key cap; and a second editable data field that display the key function data of the key cap, wherein the virtual key cap is shown to be placed on the virtual input device in a same corresponding location that the key cap is positioned on the input device, wherein changes to the key cap ID data in the editable data field causes a correspond change to the key cap ID data stored in the memory structure of the key cap, and wherein changes to the key function data in the second editable data field causes a corresponding change to the key function data stored in the memory structure of the key cap. In some embodiments, the memory structure of the key cap is further operable to store credit data corresponding to an amount of available credits associated with the key cap, wherein when the key cap is depressed, the available credits stored in the memory structure is reduced by a predetermined amount. The key function data can include a plurality of functions stored as a macro in the memory structure of the key cap. The key cap may be operable to wirelessly receive power from the transceiver circuit in the key body. In some embodiments, the key cap is operable to receive power from the transceiver circuit in the key body via a wired or wireless power coupling, wherein the key cap includes a display configured to depict an image associated with the key cap ID data, wherein the display is an LED display or an e-ink display, and wherein the display is powered by the received power from the transceiver circuit in the key body. In certain implementations, the key cap further includes one or more sensors including at least one of an environmental sensor, light sensor, biometric sensor, or a MEMS sensor, wherein the one or more sensors are powered by the received power from the transceiver circuit in the key body, and wherein the key cap transfers sensor data from the one or more sensors to the transceiver circuit in the key body. In some implementations, the memory structure further stores operational data for the input device in a profile, wherein the operational data corresponds to one or more settings for an input element on the input device. In some embodiments, the input device is a keyboard or a computer mouse, and the one or more settings includes at least one of: a dots-per-inch setting; a shortcut; an RGB lighting setting; a roller resistance; a click feedback profile; a report rate setting; a key assignment setting; or a power mode setting.

In further embodiments, a method of operating a keyboard comprises: detecting, by one or more processors, an activation of a key on the keyboard; reading, by the one or more processors, a memory element on a key cap of the key, the memory element operable to store key data including: a key cap identification (ID) data; and a key function data corresponding to a key function; and generating a control signal operable to cause a host computing device communicatively coupled to the keyboard to perform a function based on the key cap ID data and key function data. The key cap can include a transceiver circuit, wherein the reading of the memory element on the key cap is facilitated via wireless inductive coupling with the transceiver circuit. In some cases, reading of the memory element on the key cap is performed while the key is pressed. In some aspects, the control signal controls the host computing device by causing the host computing device to: update a visual representation of the keyboard on a display controlled by the host computing device, the visual representation of the keyboard including: a virtual keyboard with a virtual key cap; an editable data field that displays the key cap ID data of the key cap; and a second editable data field that display the key function data of the key cap, wherein the virtual key cap is shown to be placed on the virtual keyboard in a same corresponding location that the key cap is positioned on the keyboard, wherein changes to the key cap ID data in the editable data field causes a correspond change to the key cap ID data stored in the memory structure of the key cap, and wherein changes to the key function data in the second editable data field causes a corresponding change to the key function data stored in the memory element of the key cap. In some embodiments, the key cap is operable to receive power from the transceiver circuit wirelessly or via a wired implementation. The key cap may include a display configured to depict an image associated with the key cap ID data, wherein the display is an LED display or an e-ink display, and wherein the display is powered by the wirelessly received power from the transceiver circuit. The key cap may further comprises one or more sensors, wherein the one or more sensors are powered by the wirelessly received power, and wherein the key cap transfers sensor data from the one or more sensors to the transceiver. In some cases, the one or more sensors include at least one of an environmental sensor, light sensor, biometric sensor, or a MEMS sensor.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
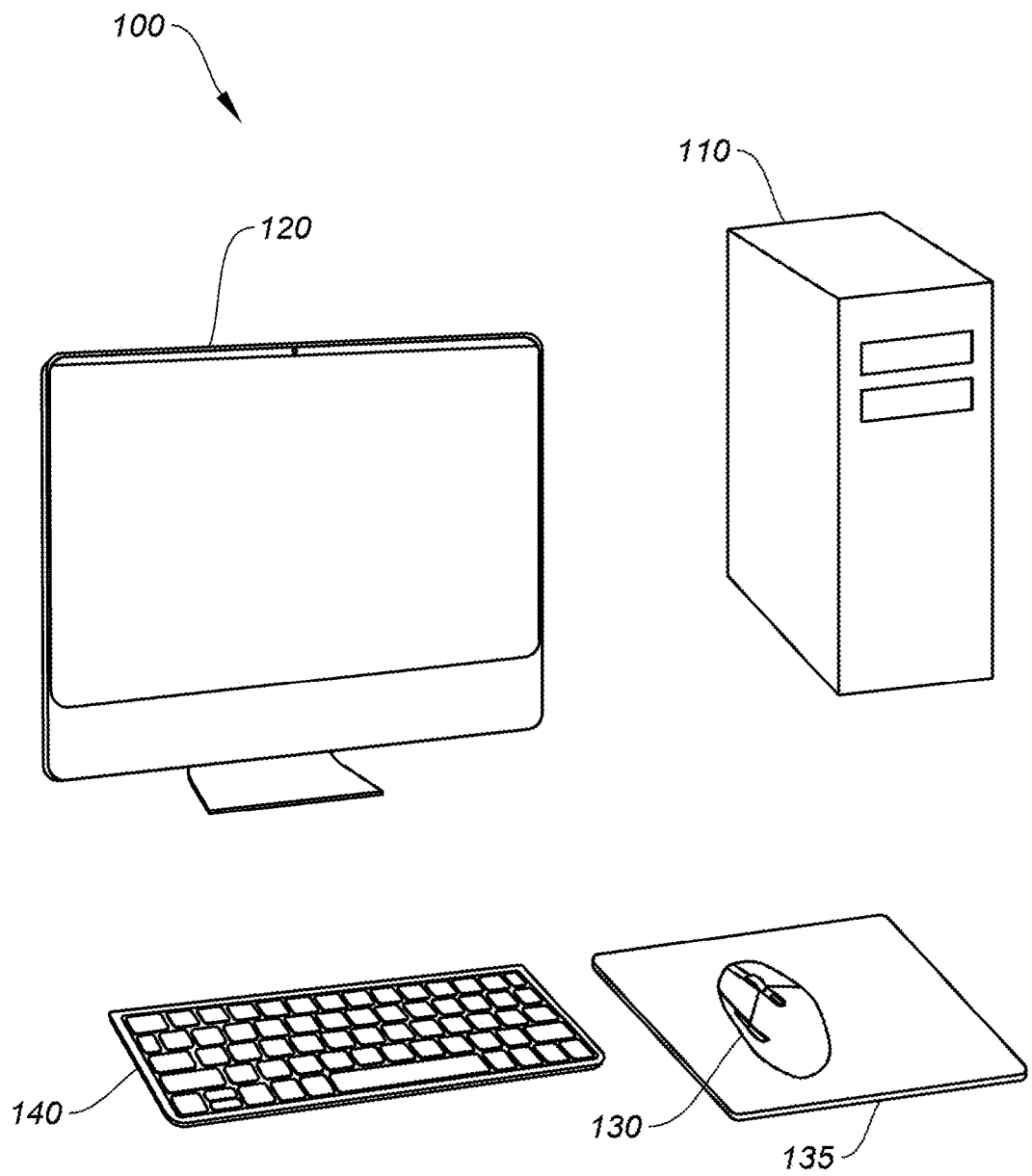
FIG. 1 shows a simplified example of a computer system that can include any of a variety of host computing devices and computer peripheral devices, including computer peripheral devices (e.g., a computer mouse, keyboard, etc.) that can be configured to perform aspects of the various inventive concepts described herein.

Aspects of the present disclosure relate generally to input devices, and more particularly to smart keys configured to allow a user to swap key caps on a key structure for an input device, which can change a corresponding function for said key structure, according to certain embodiments.

In the following description, various examples of smart keys are described. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to prevent any obfuscation of the novel features described herein.

In certain embodiments, systems and methods described herein facilitate input device (e.g., keyboard) customization by allowing a user to physically switch out and replace key caps (and corresponding functions) on one or more key structures of an input device. The novel key structures are generally referred to herein as "smart keys" generally, and may include a key switch, key body (which may be integrated with the key switch), and the key cap, as well as the infrastructure (e.g., transceiver(s) like a radio-frequency identification (RFID) antenna, RFID tags, etc.) that allows the smart key system to operate. As each smart key cap is removed and replaced, the system recognizes the new key cap in real time, allowing a user to reconfigure one or more keys including their ID and corresponding function(s). These real-time changes to the key caps and the corresponding IDs and function(s) are recognized by the input device, in real-time, and corresponding commands (e.g., human interface device (HID) commands) can be sent to a host computing device coupled thereto. In some embodiments, a proprietary command can be sent, which can be decrypted by software on the host computing device. In some aspects, the key cap may be associated with any suitable function, such as an alphanumeric character, an emoji, a macro, sensors, lighting elements, and more, as further described below. Thus, a user can reconfigure their entire keyboard or a portion thereof (e.g., a single key) with any desired assortment and location of keys and corresponding functions by simply placing one or more new smart key caps on corresponding key bodies of an input device. In some embodiments, the processing and facilitation of the key function changing can occur at the firmware (FW) level (e.g., code/operations executed inside of the computer peripheral device's processor(s) 210), at software level (e.g., on the host computing device), or a combination thereof to enable the newly assigned keys and corresponding features.

In some embodiments, in order to facilitate a physical swapping of a key cap and change a corresponding function of the key structure, the system can be configured to: (1) determine the type of key cap (e.g., key cap identification data and key function data), which can be transmitted (e.g., via RFID, NFC, etc.) from the key cap to the input device; (2) determine when the smart key is pressed (e.g., a key press on a keyboard), and (3) determine the location of the new key cap on the input device (e.g., to update a look up table (LUT) and facilitate a lower latency). In some embodiments, a smart key structure may be comprised of three elements including a smart key cap (e.g., with a wired or wireless communication capability made possible, e.g., via an RFID tag configured therein), a reading circuit (e.g., including a reading transceiver such as an antenna (e.g., RFID) for wireless implementations), and firmware and/or software to process data associated with the smart key cap, which may include dedicated software (SW) on the host computing device, for instance, if the command associated with the key cap is not a standard keyboard command (e.g., vendor HID command or shortcuts, emojis, or special function (e.g., for gaming, productivity, etc.)). In some aspects, other types of wireless tags can be used. It should be noted that the smart key structures are not limited to any communication or RF technologies and frequencies, not limited to keyboards (e.g., could be used on keypad, mouse, gaming controller, or the like), and not limited to storage of single key information (e.g., a silicon keypad with many keys and one tag). Thus, at a high level, the smart key cap can have embedded memory that can store any suitable function that can be effectuated by the smart key cap (e.g., when pressed), and the embedded memory can be optionally programmed by a user. In addition to singular functions, complex functions can be performed on the data the memory receives, stores, and sends. In some cases, smart key caps may employ sensors, lighting elements, actuators, or the like, that can be controlled and/or driven elements of the key cap tag. These and many other features and capabilities of the smart key caps are described in further detail below.

FIG. 1 shows a simplified example of a computer system 100 that can include any of a variety of host computing devices and computer peripheral devices, including computer peripheral devices (e.g., a computer mouse, keyboard, etc.) that can be configured to perform aspects of the various inventive concepts described herein. Computer system 100 can include computer 110, monitor 120, computer mouse 130, and keyboard 140. In some embodiments, input device 130 can be a computer mouse (e.g., operating on a mouse pad 135), a remote-control device, a game controller (e.g., game pad, joystick, flight stick, etc.) or elements thereof (e.g., hat switch), or other suitable device that can be used to convert analog inputs into digital signals for computer processing. In some cases, keyboard 140 can be a "qwerty" style keyboard, or any suitable input device (e.g., internet-of-things device, AR/VR controller, or the like) with one or more keys that can be configured as swappable "smart keys," as further described throughout this disclosure. For computer system 100, input device 140 can be configured to control various aspects of computer 110 and monitor 120, as would be appreciated by one of ordinary skill in the art with the benefit of this disclosure. The monitor 120, computer mouse 130, and keyboard 140 may be referred to as "computer peripheral devices." Computer peripheral devices 120-140 can be communicatively coupled to host computing device 110. Although many of the examples presented herein utilize smart key structures in a keyboard-type computer peripheral device, it would be understood by those of ordinary skill in the art with the benefit of this disclosure that the usage of smart key structures can be applied to other types of input devices.

Computer 110 can be any suitable computing device including, but not limited to, a desktop computer, a laptop computer, a tablet or "phablet" computer, a smart phone, a PDA, a wearable device (e.g., smart watches, smart glasses), virtual reality/augmented reality (AR/VR) system, or the like. A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) (see, e.g., processor 210 of FIG. 2) to control aspects of the host computing device, for instance, via the one or more computer peripheral devices. The various embodiments described herein generally present smart key structures configured on a keyboard, however any suitable input/output (I/O) device (e.g., user interface device, control device, input unit, or the like) that may be adapted to utilize smart key cap structure as described and/or contemplated herein.

Figure 2:
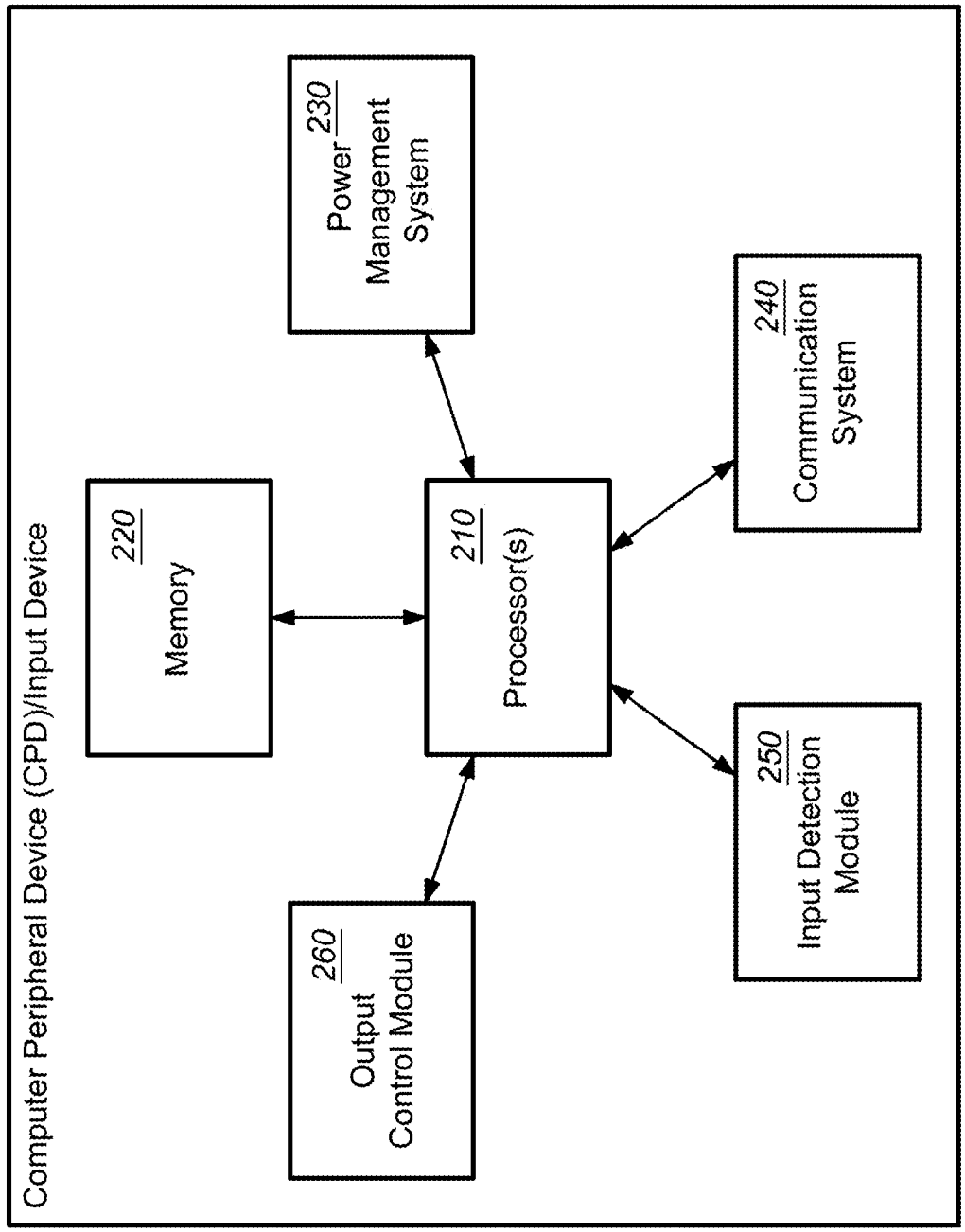
FIG. 2 shows a simplified block diagram of a system to operate an input device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices shown or not shown herein but within the wide purview of the present disclosure. System 200 may include processor(s) 210, memory 220, a power management system 230, a communication module 240, an input detection module 250, and an output control module 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules") may be implemented as separate blocks, or alternatively, more than one system block may be implemented in a single block. In the context described herein, system 200 can be incorporated into any computer peripheral devices (e.g., input devices) described or mentioned herein and may be further configured with any of the smart key structure technology presented herein, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of keyboard 140 (e.g., system blocks 220-260). Alternatively or additionally, some of system blocks 220-260 may include an additional dedicated processor, which may work in conjunction with processor(s) 210. For instance, MCUs, μCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the computer peripheral device (e.g., contained therein), may be external to the computer peripheral device (e.g., off-board processing, such as by a corresponding host computing device), or a combination thereof. Processor(s) 210 may perform any of the various functions and methods described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by one or more processors (e.g., processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM), data stored in a smart key cap (e.g., RFID tags), as further described below, and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the computer peripheral device, such as a detected movement of the computer peripheral device, a sensor (e.g., optical sensor, accelerometer, etc.), activation of one or more input elements (e.g., smart key structures, buttons, sliders, touch-sensitive regions, etc.), or the like. Stored data may be aggregated and sent via reports to a host computing device.

In certain embodiments, memory 220 can store the various data described throughout this disclosure. For example, memory 220 can include multiple data storage elements including memory elements (e.g., RFID tags) configured within each smart key cap, as further described below. Thus, there can be a memory structure configured to perform more conventional operations of a computer peripheral device (e.g., store sensor data, keyboard operational data, etc.) and additional memory structures (e.g., memory elements of the smart key caps) that can store individual IDs, functions, or other data for each individual smart key cap. Memory 220 can be used to store any suitable data to perform any function described herein and as would be appreciated by one of ordinary skill in the art with the benefit of this disclosure. Memory 220 can be referred to as a storage system or storage subsystem and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled switches, etc.) as described herein.

Power management system 230 can be configured to manage power distribution, recharging, power efficiency, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose), or it can use a USB connection to recharge the battery. In some aspects, power management block 240 (e.g., alone or in conjunction with other blocks of system 200) may control aspects of powering aspects of the smart key caps transceivers (e.g., such as local or global antennas), as further described below.

Communication system 240 can be configured to enable wireless communication with a corresponding host computing device (e.g., 110), or other devices and/or computer peripherals, according to certain embodiments. Communication system 240 can be configured to provide radiofrequency (RF), Near-Field Communication (NFC), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 140 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control module 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements on an input device. For instance, input detection module 250 can detect user inputs from motion sensors, keys (e.g., smart key structures, conventional keys), or buttons (e.g., depressible elements), roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.), an image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 or subset thereof can be subsumed by processor 210, or in combination therewith.

In some embodiments, input detection module 250 can detect a touch or touch gesture on one or more touch sensitive surfaces on keyboard 140. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 140 may or may not utilize touch detection or touch sensing capabilities.

Input detection block 250 can include touch and/or proximity sensing capabilities. Some examples of the types of touch/proximity sensors may include, but are not limited to, resistive sensors (e.g., air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photodetectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

Input detection module 250 may include a movement tracking sub-block that can be configured to detect a relative displacement (movement tracking) of a computer peripheral device. For example, input detection module 250 optical sensor(s) such as IR LEDs and an imaging array of photodiodes to detect a movement of a computer peripheral device relative to an underlying surface. A computer peripheral device may optionally include movement tracking hardware that utilizes coherent (laser) light. Moving tracking can provide positional data (e.g., delta X and delta Y data from last sampling) or lift detection data. For example, an optical sensor can detect when a user lifts the computer peripheral device (e.g., computer mouse 130) off of an underlying surface (also referred to as a "work surface") and can send that data to processor 210 for further processing. In some embodiments, processor 210, the movement tracking block (which may include an additional dedicated processor), or a combination thereof, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers (e.g., in a "3D air mouse," HMD, or another device). Accelerometers can further determine if the computer peripheral device has been lifted off of an underlying surface and can provide movement data that may include the velocity, physical orientation, and acceleration of a computer peripheral device. In some embodiments, gyroscope(s) can be used in lieu of or in conjunction with accelerometer(s) to determine movement or input device orientation.

In some embodiments, output control module 260 can control various outputs for a corresponding computer peripheral device. For instance, output control module 260 may control a number of visual output elements (e.g., LEDs, LCD or LED screens/keys), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as separate entities. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

Figure 3:
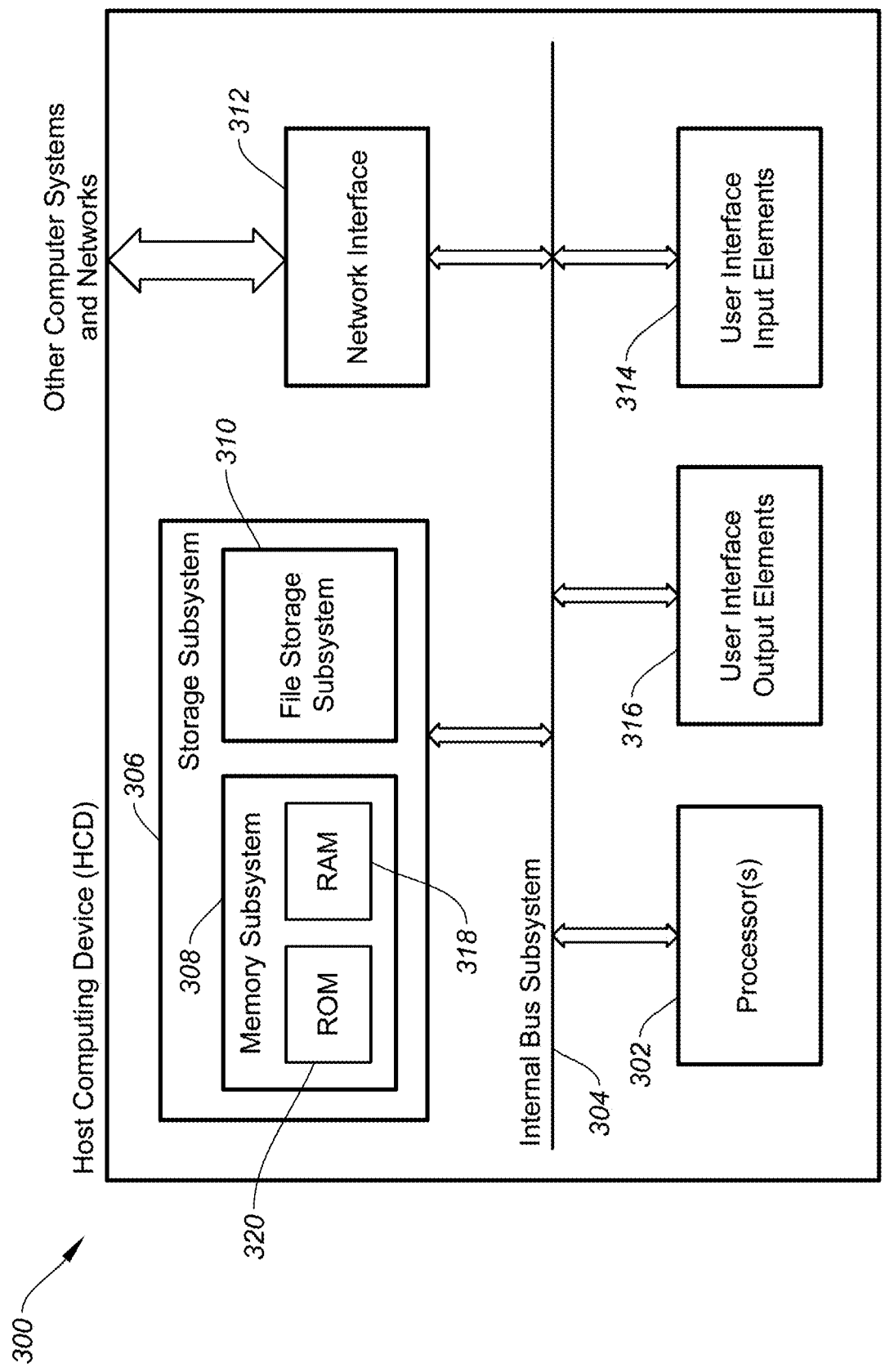
FIG. 3 is a simplified block diagram of a host computing device, according to certain embodiments.

FIG. 3 is a simplified block diagram of a host computing device 300, according to certain embodiments. Host computing device 300 can implement some or all functions, behaviors, and/or capabilities described herein that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function, portions of functions, or a combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general-purpose computer system, the general-purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE, 5G; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Figure 4:
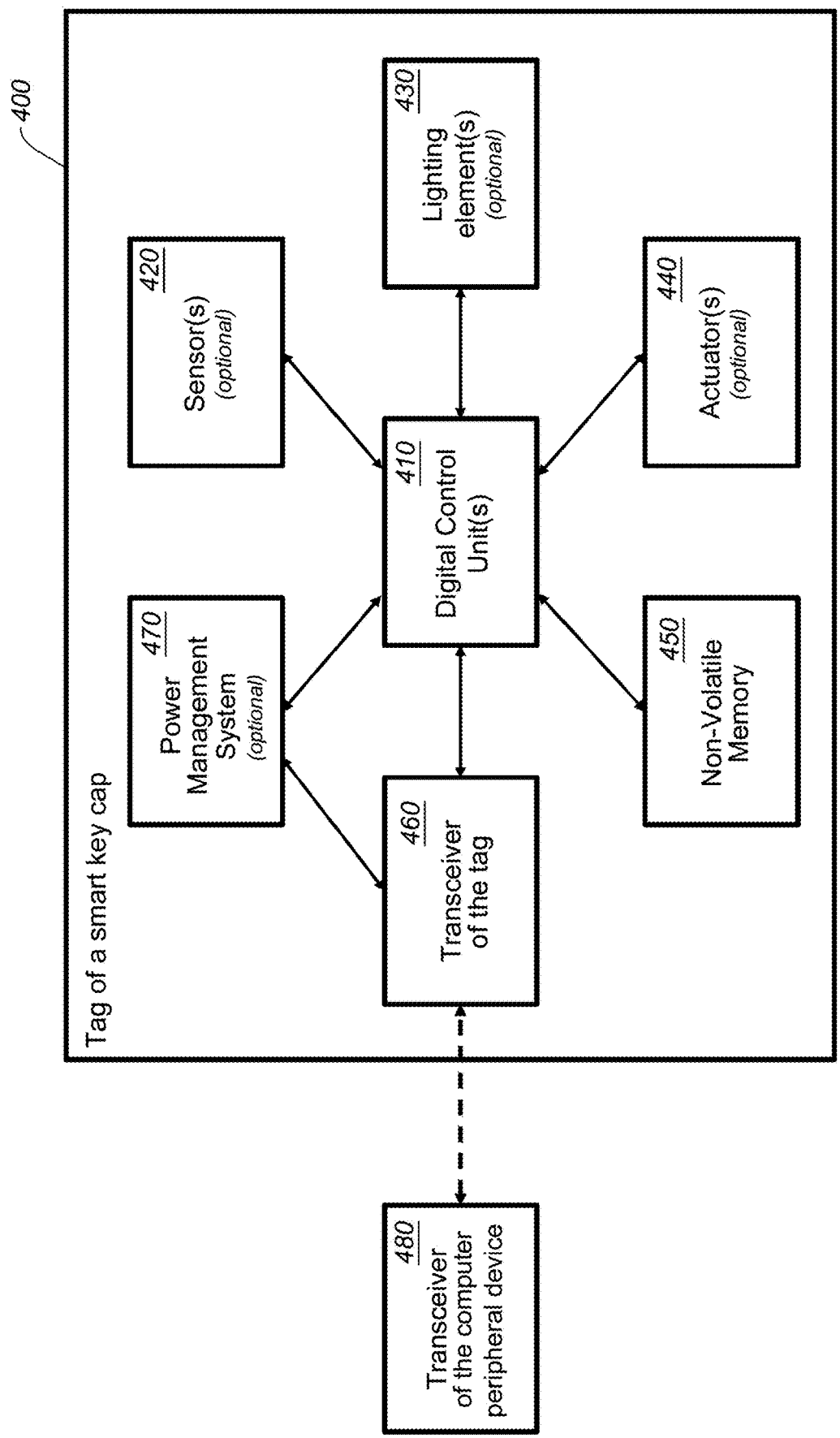
FIG. 4 is a simplified block diagram of a smart key cap, according to certain embodiments.

FIG. 4 is a simplified block diagram of a smart key cap 400, according to certain embodiments. The smart key cap 400 may include a digital control unit(s) 410, one or more sensors or sensor systems 420, a lighting element(s) 430, actuator(s) 440, memory 450, transceiver 460, and power management system 470. Smart key cap 400 may include more or fewer functional blocks, and some features may be subsumed in other blocks (e.g., power management may be performed in whole or in part by processor(s) 410).

Processor(s) 410 may include one or more digital control units and can be configured to control the operation of system 400. Alternatively or additionally, processor(s) 410 may include one or more microprocessors, microcontrollers (MCUs), digital signal processors (DSPs), or the like, with supporting hardware and/or firmware (e.g., memory, programmable I/Os, etc.), as would be appreciated by one of ordinary skill in the art. Processor(s) 410 can control some or all aspects of the operation of smart key cap 400 (e.g., system blocks 420-470).

Smart key cap 400 may optionally include sensor(s) 420, which may include ambient light sensor(s), temperature sensor(s), biometric sensor(s) (e.g., fingerprint, heart rate, etc.)), or other typically low power consumption features, which can be directly integrated inside of the keycaps. Sensor data from on-board sensors on the smart key cap can be transferred to the computer peripheral device and/or the host computing device by communicating from the smart key cap transceiver to one or more transceivers of the computer peripheral device, as described above.

Smart key cap 400 may further optionally include one or more lighting elements 430 including LEDs, backlighting elements, displays, or the like, that can be used to illuminate insignia or sub-portion of insignia on the smart key cap, provide ambient lighting for the key and/or computer peripheral device, and the like, as would be appreciated by one of ordinary skill in the art with the benefit of this disclosure.

Smart key cap 400 may further optionally include one or more actuators 440 that can be configured to provide haptic feedback, speakers and/or buzzers, moving parts that modify the aspect or shape of the key cap, locking mechanism for the key cap (e.g., key cap being attached/locked to the key switch or key cap holder, and where this locking is controlled by the computer peripheral device via an actuator in the smart key cap), or the like.

Smart key cap 400 may include memory 450, according to certain embodiments. Memory 450 can include one or more data storage elements including memory elements configured within each smart key cap. Thus, there can be a memory structure configured to perform more conventional operations of a computer peripheral device (e.g., store sensor data, keyboard operational data, etc.) and additional memory structures (e.g., memory elements of the smart key caps) that can store individual IDs, functions, or other data for each individual smart key cap. Memory 450 can be used to store any suitable data associated with the smart key cap that may correspond to a key cap ID, a key function, or other data (e.g., which may be included in the key function memory, or other memory elements), as further described throughout the present disclosure.

Smart key cap 400 may include transceiver 460 (transceiver of the smart key cap), according to certain embodiments. The transceiver 460 may be a circuit or system that is operable to communicate with the computer peripheral device (e.g., via a transceiver of the computer peripheral device) via one of RF, inductive, magnetic, galvanic, or optical-based communication protocols, as would be appreciated by one of ordinary skill in the art with the benefit of this disclosure. Transceiver 460 may be in bidirectional electronic communication with transceiver 480, which may be a global or local transceiver of the computer peripheral device (e.g., communication system 240).

Smart key cap 400 may optionally include a power management system 470 that may be operable to manage power distribution, recharging, power efficiency, and the like. In some embodiments, power management system 470 can include a battery (not shown), or other energy storage device (e.g., capacitor, coil). In certain embodiments, the functions provided by power management system 470 may be incorporated into processor(s) 210. Alternatively, some embodiments may not include a dedicated power management block. For example, functional aspects of power management block 470 may be subsumed by another block (e.g., processor(s) 410) or in combination therewith. In some aspects, power management block 470 (e.g., alone or in conjunction with other blocks of system 200) may control aspects of inductively powering aspects of the smart key cap via transceivers such as RFID antenna(s) (e.g., local or global antennas), as further described below.

Figure 5:
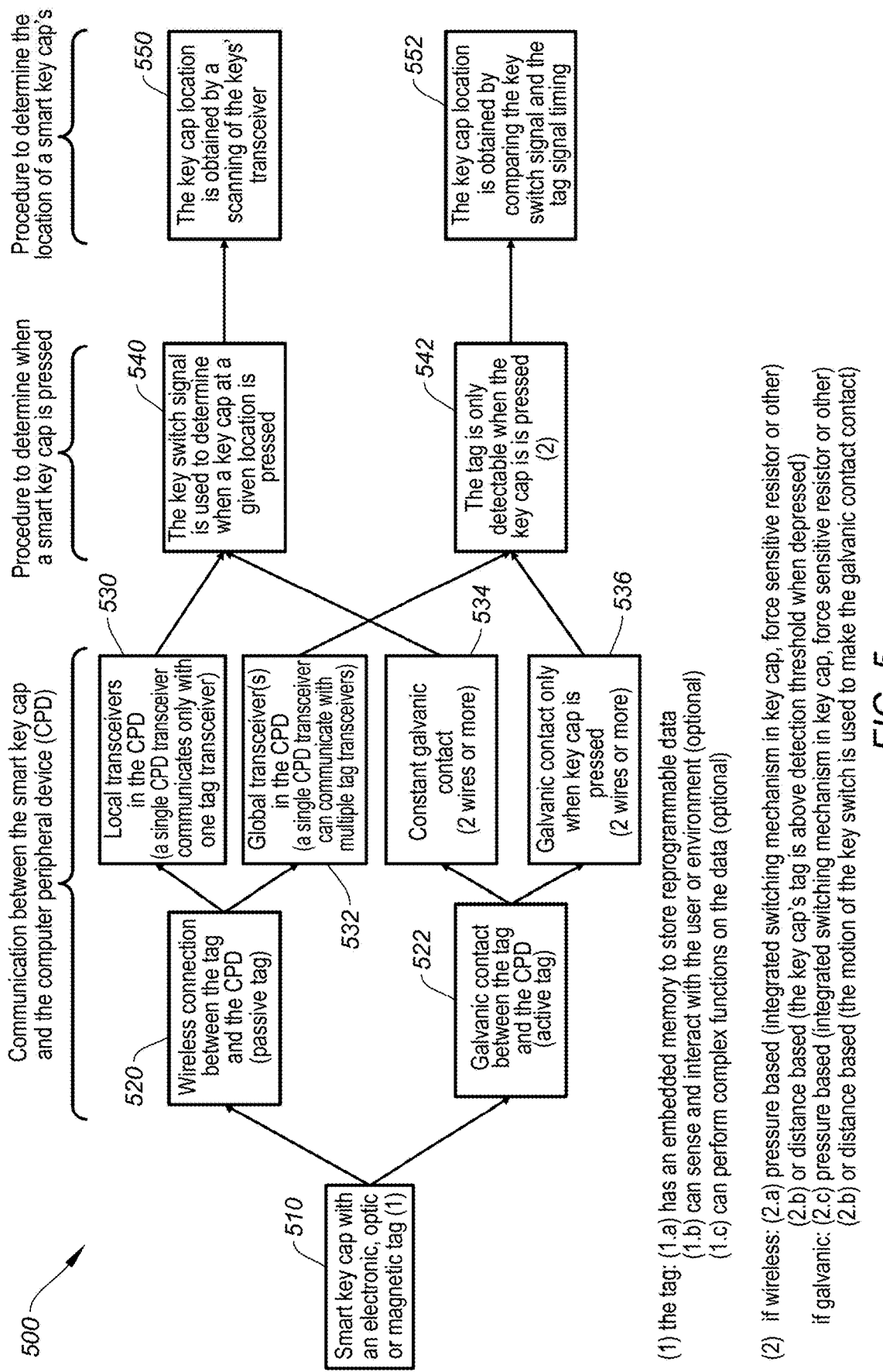
FIG. 5 is a tree diagram showing a plurality of different systems and methodologies for implementing a smart key cap system, according to certain embodiments.

FIG. 5 is a tree diagram 500 showing a plurality of different systems and methodologies for implementing and operating smart key structures, according to certain embodiments. As noted above, a "smart key structure" is a general term for the infrastructure that enables smart key cap technology that may include a key body and key switch (or combination thereof) and a key cap configured to couple to the key body or key switch, as further described below. In some aspects, a smart key cap can incorporate an electronic tag (e.g., RFID tag) that stores predefined data (e.g., referred to as a "smart tag"). Wired and wireless implementations are possible, with each having multiple sub-embodiments thereof. For example, wired embodiments can have implementations where the smart key cap is always connected, or configured to make a connection when the smart key cap is pressed. Wireless embodiments may use local transceiver architectures, global transceiver architectures, or architectures using an array of transceiver that achieves global (input device-wide) coverage. Local transceiver architectures typically have each smart key with its own transceiver (e.g., antenna) configured below it.

Referring back to FIG. 5, tree diagram 500 shows aspects communication between a smart key cap and a corresponding computer peripheral device ("CPD") (e.g., keyboard 140), procedures to determine when a smart key cap is pressed, and procedures to determine the location of a smart key cap on the computer peripheral device, according to certain embodiments. Starting with box 510, a smart key cap can include one or more memory elements that can store predefined data. The memory element(s) can be an RFID tag (see, e.g., FIG. 8), optic tag (e.g., bar code, QR code, circular bar code, shot code), magnetic (e.g., magnetic stripe, magnet orientation), wire memory (e.g., EEPROM ICs), or other suitable memory element. The data stored in the smart key caps can be transmitted to the keyboard (140) by either a wireless (box 520) or wired transmission protocol (box 522). The predefined data can include ID data, function data, sensor data, and more, as further described below.

In some wired protocols, the smart key cap can be an active memory element (e.g., powered via power management system 230) and the smart key cap and corresponding memory element(s) may be physically coupled to the keyboard via a connector that may always remain connected (e.g., galvanic contact between the smart tag and the CPD), or may make a temporary connection when the key cap is depressed (box 522). In some aspects where the smart key cap is always connected (box 534), a standard key signal (indicating a key press) may be used by the system to determine when a key at a given location on the keyboard has been pressed (box 540) and the location obtained by scanning the smart keys' transceiver (box 550). In such cases, a modulation of a key switch (e.g., SPST type switch signal) can be scanned to determine when a key is pressed. Furthermore, wired connections may have access to additional power (e.g., Vcc or Gnd) via the switch (and keyboard infrastructure) or from one or more signal buses (e.g., signal bus for all/some smart key caps). In some cases, the smart key cap location can be determined by comparing the standard key signal timing with the memory element signal timing.

In aspects where the smart key cap is connected during a key press event (e.g., galvanic contact only), the memory element may be detectable when the key cap is pressed, as data transfer in a wired-only system can transmit data when a physical connection is available (box 536). In some cases, the wired connections may have access to additional power (e.g., Vcc or Gnd) from one or more signal buses. In some cases, the smart key cap location can be determined by comparing the standard key signal timing with the memory element signal timing. In some aspects, with galvanic contact only, the key switch signal can be used to determine when a key cap at a given location is pressed (box 540), and the key cap location may be obtained by a scanning of the keys' transceiver (box 550).

In some wireless protocols, the smart key cap can be a passive memory element and may transmit data from a transceiver (e.g., tag antenna) on the smart key cap (e.g., RFID tag) and the reading transceiver(s) configured on the keyboard, which can include a global transceiver (e.g., antenna) or an array of local transceivers, with individual transceivers for each smart key cap. In some aspects, a hybrid style array of transceivers may include a semi-global transceiver that covers a subset of the total number of smart key caps. With a global transceivers (box 532), data from the passive memory element(s) may be detected when the key cap is pressed (box 542), for instance, by pressure-based detection, according to certain embodiments. For example, the actuation force from the user (when pressing the keycap) can be used to electrically "close" the tag circuit, thus making it detectable by the reader on the keyboard. The circuit can be closed by (for instance) a small switching mechanism inside of the tag itself or by an element that can vary its resistivity based on the applied pressure (e.g., FSR). Pressure-based detection can incorporate an integrated switching mechanism, force sensitive resistor, or the like. With distance-based detection, a smart key cap may be determined to be pressed when the signal is above a given signal threshold. For example, above a certain distance, the smart tag may be too far from the reader to be detected. If that threshold distance is between the switch depressed and unpressed positions, then the smart tag is typically read when the switch is being pressed by the user. In some aspects, the smart key cap location can be determined by comparing the standard key signal timing (e.g., key switch signal) with the memory element signal (e.g., tag signal) timing (box 552).

In some embodiments, an array of local transceivers (e.g., one transceiver (e.g., antenna) per smart key structure) may be configured such that the tag antenna is detectable by transceiver (of the array of transceivers) positioned below the smart key cap (e.g., integrated with or configured below the smart key structure) and configured for bidirectional communication with the smart key cap, according to certain embodiments (box 530). Note that bidirectional communication is possible in any embodiments described herein including global and local transceiver implementations. In some cases, each transceiver of the array of transceivers can be configured to be small enough to fit underneath or proximate to each smart key structure on the keyboard. In some aspects, a demultiplexer circuit may be used in a scanning fashion to read data from each smart key cap. In further embodiments, a dedicated reader circuit can be configured with each smart key structure. Typically, embodiments that utilize an array of transceivers are operable to determine if a key at a given location is pressed based on a standard key signal (box 540). In some aspects, the key cap location can be obtained by scanning the keys' transceiver.

Figure 6:
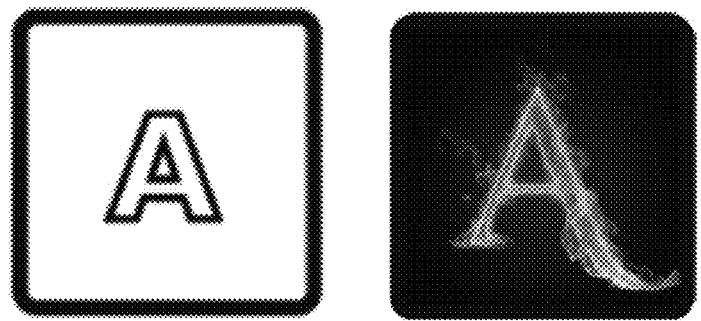
FIG. 6 shows two key caps each having a similar key function, according to certain embodiments.

The smart key cap tag (referred to herein as a "tag," "tag antenna," or more broadly as a "memory element") can store data that can be used to identify the key cap. The key cap may include any of key function data and/or, a product identification ("ID"), and/or a unique ID ("UID"). FIG. 6 shows two key caps having a similar key function (e.g., press "A"), according to certain embodiments. The first key cap has a product ID that differs from the second key cap (a stylized graphic font), and both can have different UIDs. In some embodiments that just store the product ID in the tag, the computer peripheral device may have a conversion table to match a product ID with a desired key function. In embodiments that just store the key function in the tag, the computer peripheral device may just process the information already present in the key cap (thus, no conversion table may be necessary), however in such embodiments the computer peripheral device may not know from which product (e.g., the key cap) the key function is originating. In some aspects, storing both the key function and the product ID in the tag can facilitate the identification of the key cap in use and free up computer peripheral device memory, making the system potentially more scalable and portable. In addition, in the case where similar key caps (with identical product IDs) are in use simultaneously on an input device (e.g., keyboard), a UID could be used to differentiate them. The UID can also hold production information (e.g., date and time of manufacture, production location, etc.), as would be appreciated by one of ordinary skill in the art with the benefit of this disclosure.

In some embodiments, key function data may include information that is sent to the host computing device (e.g., desktop or laptop that the input device is coupled to and sending control data, such as key press data) to generate the desired key press function on the host computing device. HID data (e.g., standard keyboard USB reports or vendor HID) may correspond to non-standard USB reports that may need dedicated software running on the host computing device to be executed. In some cases, a key press may generate a single USB report or other suitable type of report (e.g., Bluetooth, BLE, etc.). Alternatively or additionally, a key press may cause a stored macro (e.g., multiple USB reports sent sequentially) in the tag's memory to be executed by the host computing device. In some aspects, key function data may be encrypted to help prevent malicious attacks via altered 3rd party key caps and to ensure that the data present in the key cap can only be used/read by an authorized equipment.

Figure 7:
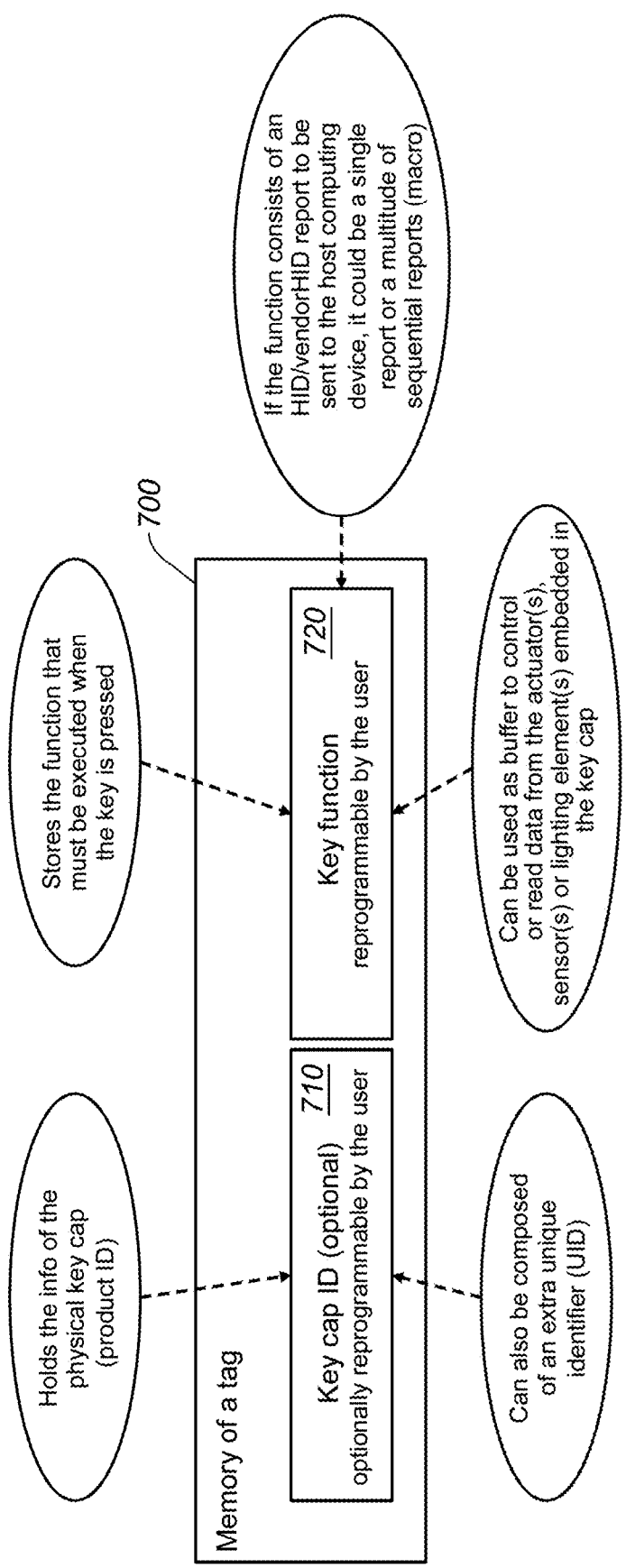
FIG. 7 shows a high-level representation of a tag memory data structure, according to certain embodiments.

In certain embodiments, users may be able to reprogram a smart key cap's corresponding functionality (e.g., key function) at the tag level, such that the key cap could be used on any other compatible keyboard while maintaining its custom feature (portability). FIG. 7 shows a high-level representation of a memory structure 700 incorporating a key cap ID field 710 and a reprogrammable key function field 720, according to certain embodiments.

In some implementations, the key cap ID 710 provides the identification of the key cap, also referred to as the "product ID," which is typically reprogrammable by the manufacturer, although other reprogramming entities may be possible. In some cases, the key cap ID may further include an extra unique identifier (UID).

In some aspects, the key function field 720 stores a function that is executed when the key is pressed (typically performed by the host computing device controlled by the computer peripheral device). Key function field 720 is reprogrammable by a user to cause the key to perform any suitable function (see, e.g., FIG. 13). In some aspects, key function field 720 can be used as a buffer to control or read data from one or more actuator(s), sensor(s), lighting element(s), and the like, that are embedded in the smart key cap, as further described at least with respect to FIG. 10. In some cases, if the key function consists of a HID or a vendor HID report to be sent to the host computing device, it could be single report or a multitude of sequential reports, such as a macro, as would be appreciated by one of ordinary skill in the art with the benefit of this disclosure.

Figure 8:
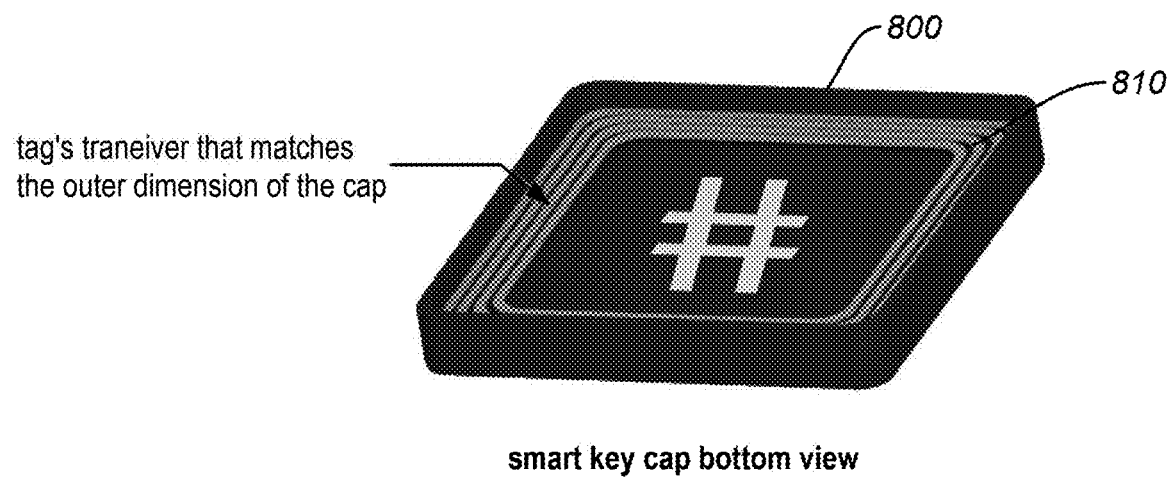
FIG. 8 shows a bottom view of a key cap with a tag configured therein, according to certain embodiments.

In some embodiments, a tag transceiver (e.g., "tag" or "tag antenna") can be comprised of any of the following combinations of components and not limited to: (1) transceiver circuit (e.g., copper coil, metal deposited on non-metal substrate) and a tag integrated circuit (IC); (2) on a rigid or flexible printed circuit board (PCB) and a tag IC; (3) printed with silver paint on a polyethylene terephthalate (PET) sheet (membrane) and a tag IC, among other implementations, as would be appreciated by one of ordinary skill in the art with the benefit of this disclosure. The tag can be mounted in the key cap by any suitable method not limited to: double-sided tape, over molding, glue, compression fit, plastic or metal hardware (e.g., clips, pins, clamps, etc.), and the like. In typical embodiments, the tag can be configured in the outer part of the key cap to prevent or reduce any interference with or obscuring of any key cap backlighting infrastructure. FIG. 8 shows a bottom view of a smart key cap 800 with a transceiver 810 (e.g., tag antenna) configured therein, according to certain embodiments. In some embodiments, ultra-high frequency (UHF) RFID (e.g., 300 MHz to 3 GHz) can be used, which may help reduce antenna size. In some embodiments, HF RFID at 13.56 MHz can be used, and well as low frequency RFID (e.g., LF RFID, 125 kHz).

The tag antenna can be on a PET membrane with silver printed thereon. A membrane switch can be in the key cap (e.g., if global reading transceiver). A carbon connector may change resistivity with the pressure in the key cap (e.g., force sensing resistor). In wired solution, pad connectors can be configured under the key cap and pins (or other suitable connectors configured to make contact when the key cap is pressed) on the keyboard. In some embodiments, an electrical connection with the tag can be made through the key cap fixation mechanism, such that the key cap maintains an electrical connection when connected to the keyboard regardless of whether the key cap is pressed. In some embodiments, the antenna can be over molded in the key cap. In some aspects, the tag can be configured on a rigid PCB and coupled (e.g., taped, glued, clipped) to the underneath of the key cap.

Preferably, it should be relatively easy for a user to remove and replace a smart key cap. If the existing fixation mechanism makes it relatively difficult for a user to swap out a key cap, an intermediary part (e.g., a key cap holder) can be added to help facilitate removal and replacement. By way of example, and as further described below, FIG. 9A shows an example of an embodiment with a key cap holder and FIG. 9B shows an example of an embodiment without a key cap holder, according to certain embodiments.

In some embodiments, the reading/writing transceiver of the computer peripheral device can be over-molded in the casing (e.g., for a global reading transceiver). Custom mechanical switches with integrated transceiver and additional pins may be utilized. In wired solutions, a tag signal can be configured on the same switch line via modulation. In some cases, a transceiver on a PET plus a silver membrane (for dome-switch keyboards or membrane-switch keyboards, scissor key keyboards, etc.) is possible, including double-sided prints with a transceiver on the top side, or in some cases further layers (e.g., 4 layers). In certain embodiments, standard key switches can be removed leaving a spring or dome structure for preferred force feedback and an RF signal can be used for key press detection. Such embodiments may work with global transceiver architectures or with a distance-based RF detection (e.g., local transceiver) architecture. In local transceiver architectures, a demultiplexer can be used. In some implementations, one reader IC per key cap can be employed. On mechanical keyboards, the footprint of the components can be reduced to their minimum (e.g., smaller LED, switches with only two pins) to allow for a bigger transceiver on the main PCB. In some embodiments, LED size can be reduced using a two-pin switch for a bigger transceiver on a main PCB. On membrane-switch or dome switch keyboards, global illumination layers are unlikely to be obstructed with smart key-based systems. In mechanical keyboard systems, transceiver(s) can be printed on a PET sheet and placed between the main PCB and a plate. In certain embodiments, the transceiver(s) could be printed directly on the plate or casing (e.g., non-metallic) and hidden using a paint layer on top.

TABLE 1

Various Key Cap Implementations for Mechanical and Dome-Based Input Devices

| | Dome-switch keyboard (3 layers membrane, i.e. flexible circuit) | |
|---|---|---|
| Mechanical-switch keyboard (standard PCB, i.e. rigid circuit) | Standard (slider guide mechanism) | Low-Profile (scissor/butterfly mechanism) |
| standard key cap fixation can be used to easily swap the key caps | Should have a key cap holder, the standard fixation is not convenient | Should have a key cap holder, the standard fixation is not convenient |

TABLE 1-continued

Various Key Cap Implementations for Mechanical and Dome-Based Input Devices

| | Dome-switch keyboard (3 layers membrane, i.e. flexible circuit) | |
| --- | --- | --- |
| Mechanical-switch keyboard (standard PCB, i.e. rigid circuit) | Standard (slider guide mechanism) | Low-Profile (scissor/butterfly mechanism) |
| Wireless implementations: Transceivers could be added on the main PCB Transceivers could be integrated inside a custom mechanical switch Transceivers could be on a layer (thin membrane or PCB) between the keyboard PCB and the plate. Transceivers could be placed or printed on the top case or plate Wired implementations: A custom switch or some extra external connectors could be added to allow the galvanic contacts between the key cap and the PCB. | Wireless implementations: Transceivers could be silver printed on the membranes Transceivers could be placed or printed on the keyboard top case, right under the key caps. Wired implementations: Connectors can be added to allow the galvanic contacts between the key cap and the membrane. | Wireless implementations: Transceivers could be silver printed on the membranes Wired implementations: Connectors can be added to allow the galvanic contacts between the key cap and the membrane. |

Table 1 above shows various implementations of input devices that use the novel key cap structures described herein, including mechanical switch keyboards and standard or low-profile dome switch keyboards, according to certain embodiments. Some described embodiments include a rigid PCB (e.g., keyboard PCB located in the keyboard housing, which is often referred to as the "main circuit") with a smart key cap in both wired and wireless implementations. The implementation in a dome switch keyboard also includes wired and wireless implementations that typically incorporate a key cap holder.

Figure 9:
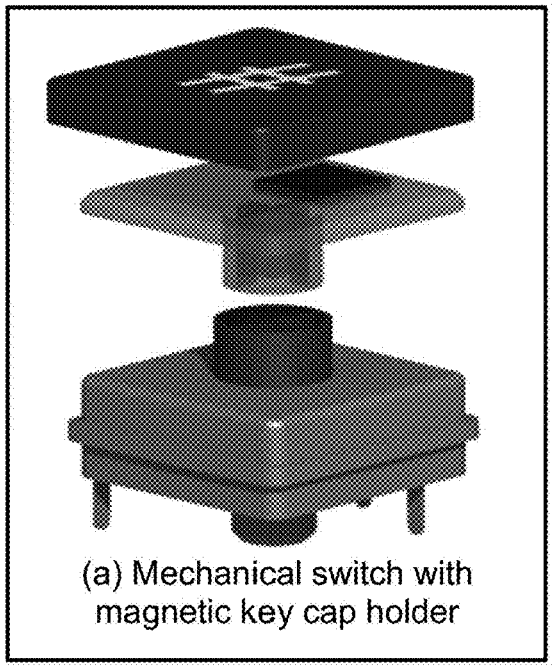
FIG. 9 shows different implementations of key caps on different input device types, according to certain embodiments.
Figure 9:
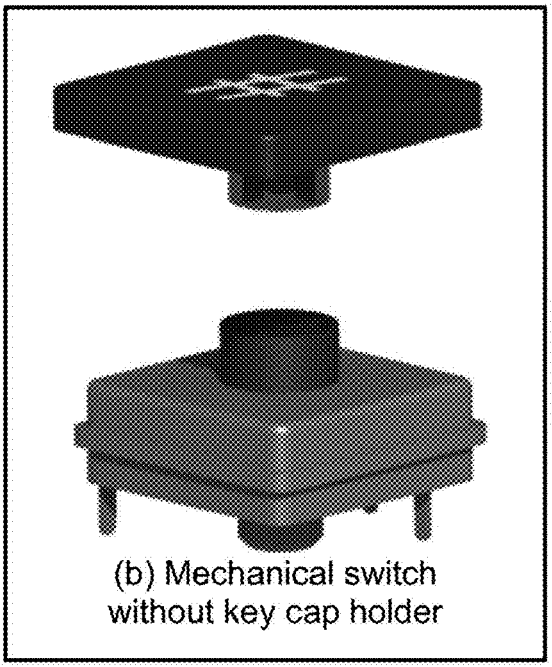
Figure 9:
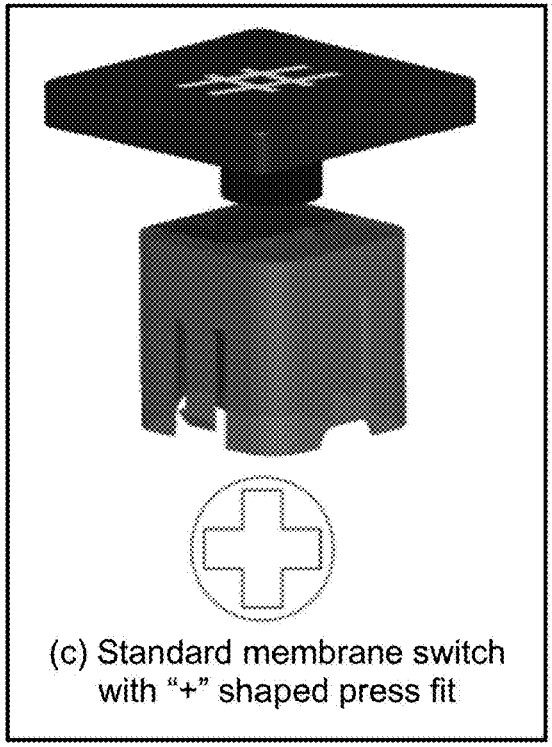
Figure 9:
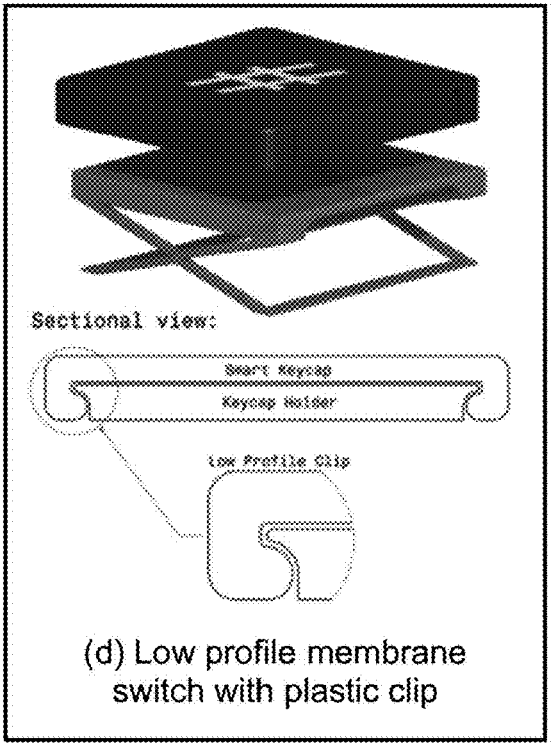

The fixation between the key cap and the key cap holder can be implemented via any suitable mechanical and/or magnetic methodologies. Some mechanical implementations may include a friction fit (e.g., press fit), such as like the "+" shape (e.g., MX style mount) on certain mechanical key switches. FIG. 9 shows a variety of different implementations of smart key caps 900 on different input device types, according to certain embodiments. In example (a), a mechanical switch is configured to couple to a smart key cap via a key cap holder with an embedded magnet(s). Example (b) shows a mechanical switch configured to be coupled directly to the smart key cap without an intervening key cap holder. Example (c) shows a standard membrane switch configured to be coupled to a smart key cap via a press-fit "plus-shaped" interface. Example (d) shows a low-profile membrane switch configured to be coupled to a smart key cap via a fastening mechanism (e.g., a clip). In implementations that use a key cap holder, an asymmetrical fixation mechanism can be used to ensure a correct orientation of the smart key cap. In the case of a wired implementation, the key cap holder may also provide an electrical contact between the smart key cap and the main circuit (e.g., PCB). One of ordinary skill in the art with the benefit of this disclosure would appreciate the many modifications, variations, and alternative embodiments thereof.

Figure 10:
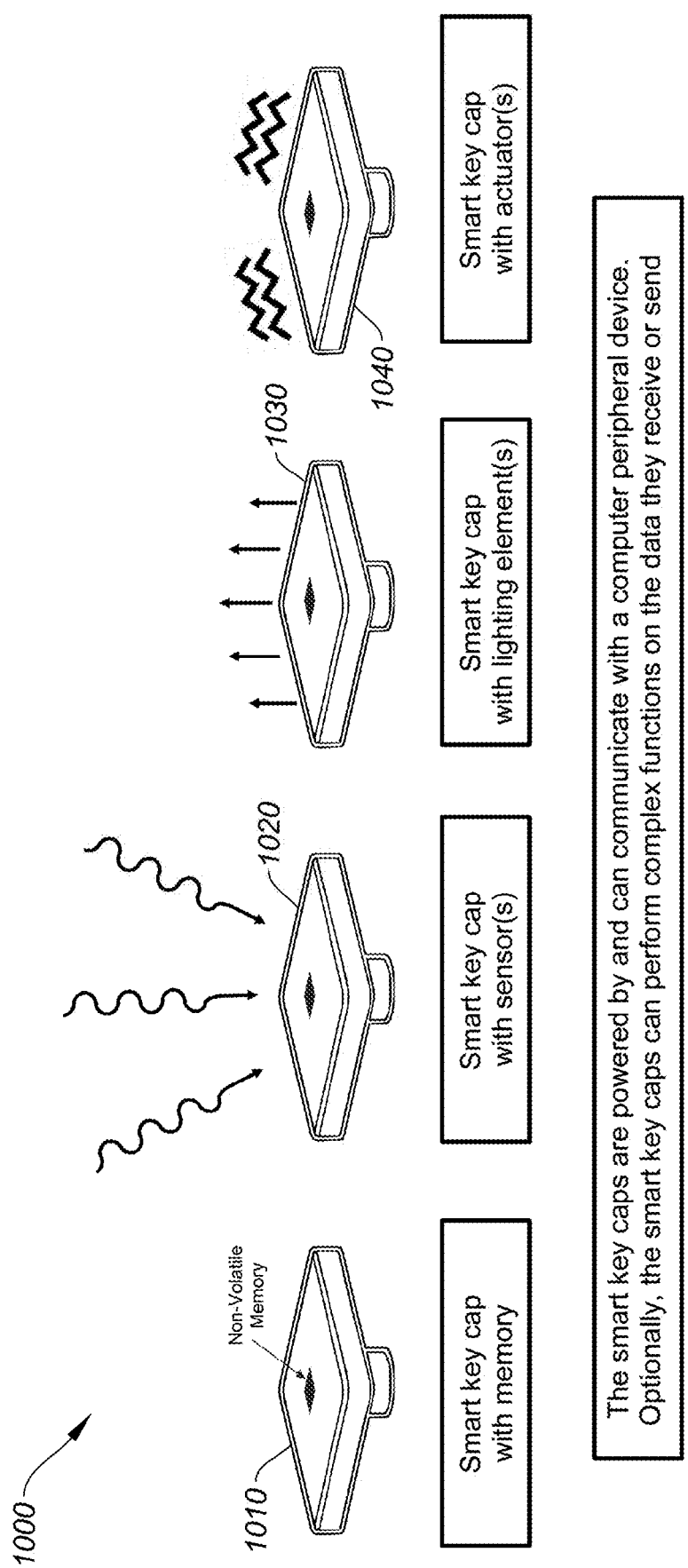
FIG. 10 shows a number of smart key caps implementing different types of functionalities, according to certain embodiments.

FIG. 10 shows a number of key cap types 1000, according to certain embodiments. Smart key cap 1010 can include memory (see, e.g., memory structure 700). Smart key cap 1020 may include one or more sensors (e.g., ambient light sensor, temperature sensor, biometric sensor, etc.). Smart key cap 1030 may include lighting elements (e.g., LED, display, backlighting elements, and the like). Smart key cap 1040 may include actuator(s) that can be configured to provide pulses, vibrations, generate sound, activate mechanisms (e.g., key cap locking), and other types of haptic feedback. Although each example shows a singular function, it should be understood that multiple functions may be integrated with a smart key cap. For instance, a smart key cap may have memory, an ambient light sensor, and two lighting elements. Any combination of functions can be used. In some aspects, as described above, the smart key caps can be powered by and can communicate with a computer peripheral device. In some implementations, the smart key caps can perform complex functions on the data they receive, hold, or send. For example, the key cap could be able to sense (e.g., via a sensor) and interact with the user (e.g., lighting element, actuator) and/or the environment. One of ordinary skill in the art with the benefit of this disclosure would appreciate the many modifications, variations, and alternative embodiments thereof.

Figure 11:
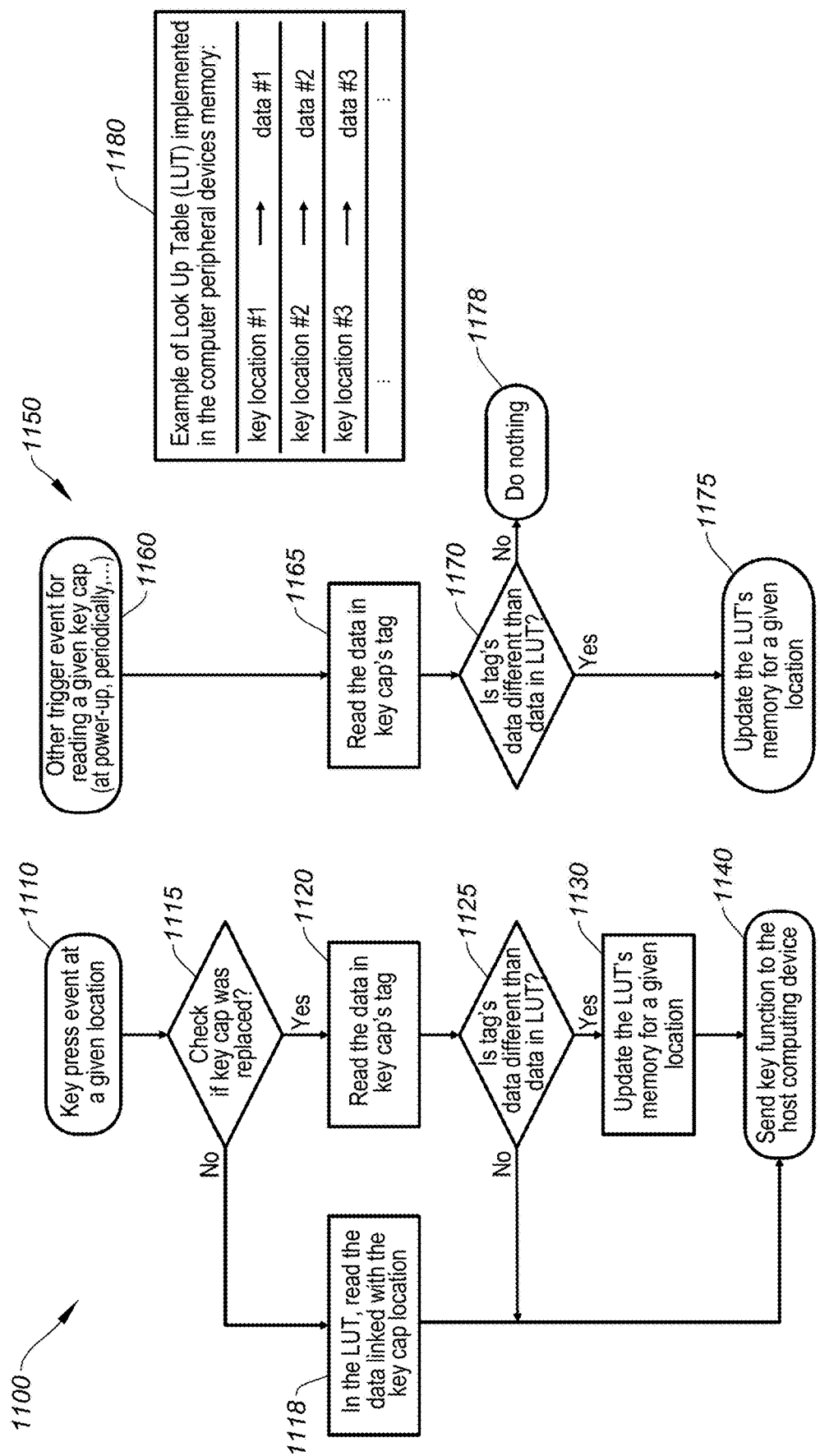
FIG. 11 shows an example of a conceptual-level firmware process for operating smart key caps on an input device, according to certain embodiments.

FIG. 11 is a simplified flow chart showing aspects of a method 1100 and method 1150 for implementing a key press event using a smart key structure(s), according to certain embodiments. Method 1100 can be performed by processing logic that may comprise hardware (circuitry, dedicated logic, etc.), software operating on appropriate hardware (such as a general-purpose computing system or a dedicated machine), firmware (embedded software), or any combination thereof. In certain embodiments, aspects of method 1100 can be performed by system 400, system 200, or a combination thereof.

At operation 1110, method 1100 involves a key press event at a given location on a computer peripheral device, according to certain embodiments.

At operation 1115, method 1100 can include checking if the key cap has been replaced, according to certain embodiments.

At operation 1118 of method 1100, if the key cap was not replaced, the system reads the data linked with the key cap location in a look up table (LUT) 1180 implemented in the memory of the computer peripheral device and sends the key function data to the host computing device (operation 1140).

In the event that the key cap was replaced (operation 1115), at operation 1120, method 1100 can include reading the data in the key caps tag, and if the data in the tag is not different than the data in the LUT (operation 1125), the system sends the key function data to the host computing device (operation 1140), according to certain embodiments. If the data in the tag is different that the data stored in the LUT, the memory of the LUT is updated for a given location (operation 1130) and the system sends the key function data to the host computing device (operation 1140).

Referring now to method 1150, at operation 1160, method 1150 involves other trigger events (besides a key press event) for reading a given key cap, which can include reading the key cap at power up, periodically, or the like, according to certain embodiments.

At operation 1165, method 1150 can include reading the data in the key cap tag, according to certain embodiments. If the data in the tag is the same as the corresponding data in the LUT (operation 1170), the LUT is not updated and method 1150 ends (operation 1178). If the data in the tag is different than the corresponding data in the LUT, the memory of the LUT is updated for the given location (operation 1175).

It should be appreciated that the specific steps illustrated in FIG. 11 provide particular methods 1100 and 1150 for implementing a key press event using a smart key structure(s), according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

In certain embodiments, key cap identification processing that occurs in the computer peripheral device, in the host computing device, or a combination thereof, can include reading the tag before sending a command (e.g., HID, proprietary, etc.), such that no LUT is needed. Extra dedicated microprocessors can be used for parallel processing and reduced latency. In some aspects, a low latency mode can include deactivating some or all of the smart keys (or stop reading them). Some embodiments may employ a dedicated button to refresh a key layout (e.g., the functional layout) when the user presses it. The key layout may be updated at any suitable interval (e.g., period of time, after an on/off cycle, when a key gets pressed, upon opening of the configuration software, etc.). In some cases, a light, sound, vibrations, pop-up visuals on a screen, or other suitable animation may be used to indicate when the functional key layout has been updated.

Figure 12:
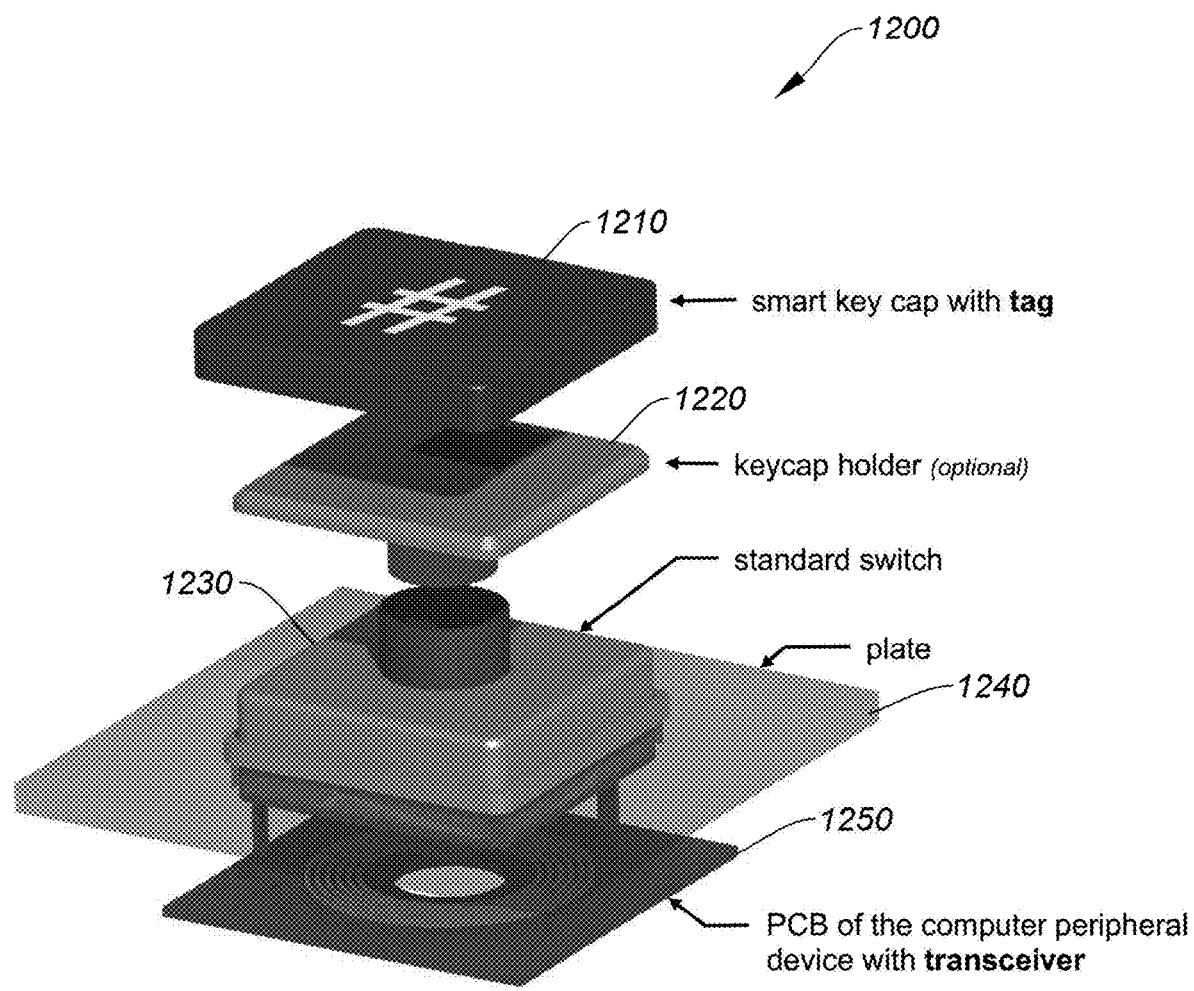
FIG. 12 shows an exploded view of a smart key structure, according to certain embodiments.

FIG. 12 shows a wireless implementation of a smart key structure 1200, according to certain embodiments. Smart key structure 1200 can include a smart key cap 1210, a key cap holder 1220, a key switch 1230, a plate 1240, and a printed circuit board (PCB) 1250. Smart key cap 1210 can include aspects of system 400 and any of the implementation described throughout the present disclosure. Key cap holder 1220 may interface smart key cap 1210 with key switch 1230 using magnetic coupling, as shown in FIG. 9, or via any suitable coupling method, as would be appreciated by one of ordinary skill in the art with the benefit of this disclosure. Key switch 1230 can include any switch type, including Cherry MX-type switches, or other suitable key switch. Plate 1240 may correspond to a body of the keyboard that provides structural rigidity for the smart key structure. PCB 1250 may be configured in the computer peripheral device and can include a transceiver circuit (e.g., global or local) to communicate with the transceiver of the key cap, as described above.

Figure 13:
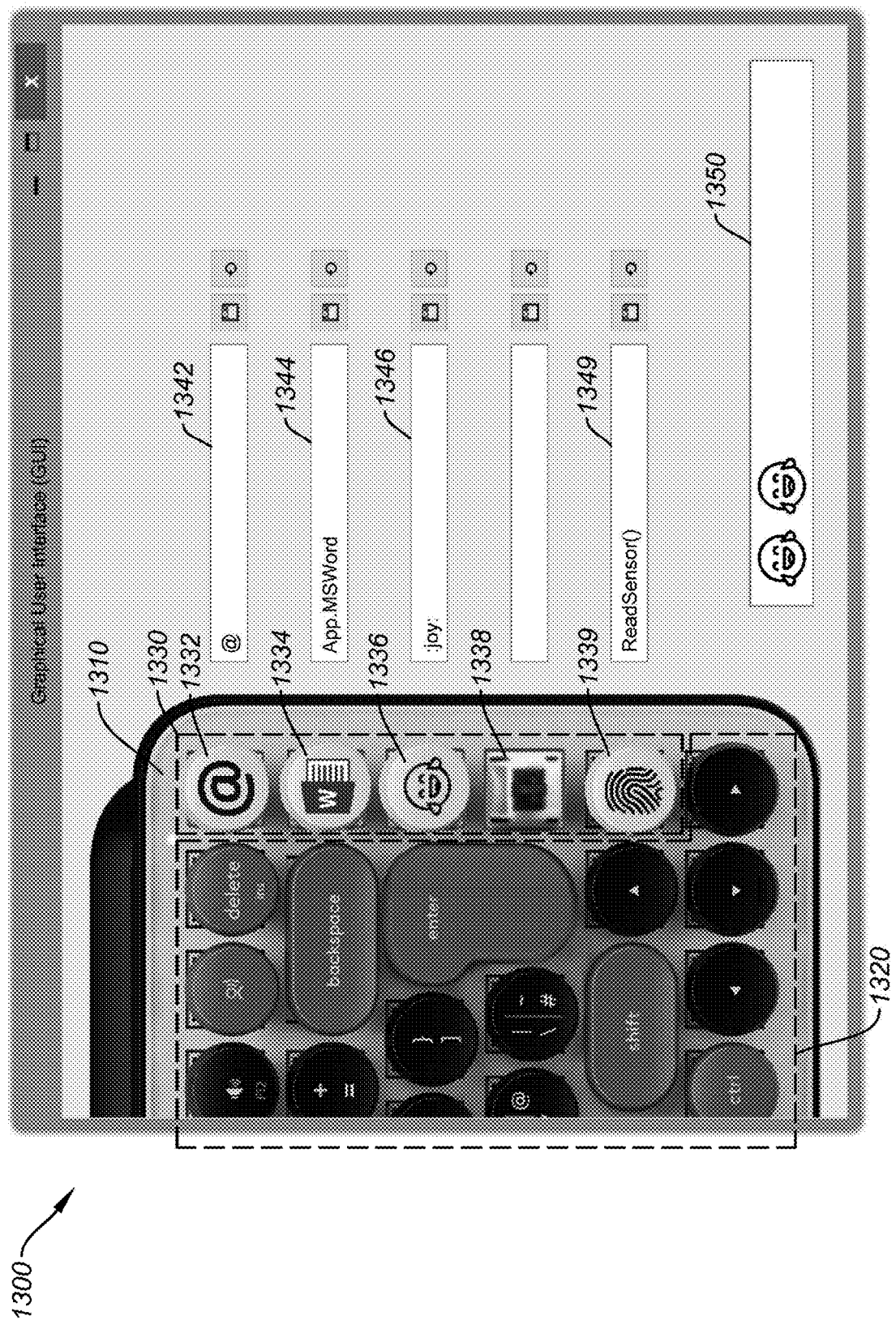
FIG. 13 depicts a graphical user interface showing aspects of placing smart key caps on a keyboard and providing a visual interface to allow users to assign and edit the corresponding functions of the smart key caps in real-time, according to certain embodiments.

FIG. 13 depicts a graphical user interface (GUI) 1300 showing aspects of placing smart key caps on a keyboard and providing a visual interface to allow users to assign and edit the corresponding functions of the smart key caps in real-time, according to certain embodiments. GUI 1300 includes an image of a keyboard 1310 having a number of key structures including virtual key structures 1320 that correspond to actual key structures on the keyboard 140 that are configured to operate like convention keyboard keys, and virtual smart key structures 1330 that correspond to actual smart key structures configured to be removed and replaced to change out a corresponding function of the particular key structure, as described above, and each include a key body configured to receive a smart key cap. A key body can include a key switch operable to provide a key press feedback profile, detect when the key cap is pressed (e.g., by a threshold distance, a threshold force, or combination thereof, etc.), and generate a control signal indicating that the key cap is pressed. GUI 1300 can be operated by software running on a host computer device (e.g., host computer 110) that is communicatively coupled to the keyboard 140, or a combination of software and firmware (e.g., operating on keyboard 140), as would be appreciated by one of ordinary skill in the art with the benefit of this disclosure. GUI 1300 may depict other aspects of the smart key cap system described herein. For instance, GUI 1300 may depict aspects of the infrastructure that allows the smart key cap technology to operate to inform the user of the underlying technology, including cutaway, exploded views, or the like, showing aspects such as the memory elements (e.g., RFID tag), the key body configured to receive the key cap, and underlying local or global RFID reader (as further described above at least with respect to FIG. 4), and the like. One of ordinary skill in the art with the benefit of this disclosure would appreciate the many modifications, variations, and alternative embodiments thereof.

Smart key structures can be configured to couple to a smart key cap in any suitable manner, including friction fit, hardware (e.g., clips, tabs, etc.), or the like, and typically via a method of coupling that allows quick release and attachment, and a complimentary fit relationship between the smart key cap and the key body. The key body can be structurally integrated with the key switch or may be separate from the key switch but may operate in conjunction therewith.

Each of the virtual smart key structures 1330 may show an editable data field that includes a corresponding function of the smart key cap that is coupled thereto. A user may change a function corresponding to a smart key cap by editing the function show in the editable data field. For example, a user may couple a smart key cap on a keyboard that corresponds to virtual key structure 1332. Referring to FIG. 13, the smart key cap placed on key structure 1332 is depicted as having an "@" symbol on the top of the key, with a corresponding textual character in the editable data field 1342. When the user presses the actual smart key, an "@" symbol may be displayed on an application running on the host computing device (e.g., a word processing application shown on display 120 and operated by host computing device 110).

In another example, a user may couple a smart key cap on a keyboard that corresponds to virtual key structure 1334. Referring to FIG. 13, the smart key cap placed on key structure 1334 is depicted as having an "Word®" symbol on the top of the key, with a corresponding executable command shown in the editable data field 1344. When the user presses the physical smart key, an MS Word® application may be launched on the host computing device.

In a further example, a user may couple a smart key cap on a keyboard that corresponds to virtual key structure 1336. Referring to FIG. 13, the smart key cap placed on key structure 1336 is depicted as having a "joy" emoji symbol on the top of the key, with a corresponding textual representation of the joy emoji symbol shown in the editable data field 1346. When the user presses the actual smart key, a joy emoji may be displayed on display 120 operated by the host computing device. In some aspects, a data field 1350 may be provided to show an output of one or more of the smart keys as they are pressed.

In another example, a user may couple a smart key cap on a keyboard that corresponds to virtual key structure 1339. Referring to FIG. 13, the smart key cap placed on key structure 1339 is depicted as having thumb print biometric scanner symbol on the top of the key, with a corresponding textual representation of an executable command in data field 1349 to instantiate a scan of the user's fingerprint on the physical key that corresponds to virtual key 1339.

In some cases, a smart key structure may not have a smart key cap installed (1338). In such cases, no corresponding data is associated with the empty socket until a user places a smart key cap in the corresponding physical slot on the keyboard 140.

Thus, GUI 1300 can present a real-time, visual representation of a modification of smart keys as they are added and removed from the keyboard 140. As a user places a smart key cap on a key body, a visual representation of the key cap is superimposed over the key body in GUI 1300 (e.g., smart key caps 1332-1339). In some aspects, a textual and/or graphical description of a function associated with the key cap is shown in an editable data field that can be positioned adjacent or proximate to the graphic of the corresponding key cap (e.g., editable data fields 1342-1349) and allows a user to change or edit the name of the smart key and/or a function of the smart key in real-time. For example, a keycap may have an image of a Photoshop® icon depicted on the top of the key cap. The corresponding editable data field may include an executable command to launch Photoshop® from a default installation location on a host computer device. If the user installed the application in an alternative folder or drive, a user could edit the executable command to cause the host computing device to launch the application from the alternative location. The change can be immediate, such that as soon as the editable data field is edited, the function is saved in the memory of the corresponding key cap, and the function will execute as soon as the user presses the corresponding key cap.

The changes made to the editable data fields of each smart key cap are stored in memory in the key cap, as described above. As such, a key cap can be physically moved from one location to another and still retain its function defined in its editable data field. For example, a key cap can be locally moved from a first key body to a second key body on keyboard 1310 and the corresponding function will move with it. Similarly, a key cap can be moved to a second input device (e.g., second keyboard) that is configured with one or more key bodies that are configured to receive smart key caps, and the corresponding function stored in its memory can be executed in the second input device. In some implementations, a key cap may include a default function that can be restored in any suitable manner, including pressing a reset pin on the keycap, resetting the default function using aspects of GUI 1300, or the like.

In some embodiments, some features may be unlocked or edited by users with special permissions. For example, a keycap may be configured to launch a website for a company and provide a number of credits for merchandise that can be stored in the smart key cap. For example, a coffee establishment may hand out a free smart key cap that is configured to launch an application for the coffee establishment when the smart key cap is pressed. The smart key cap may have stored credits for five free coffees, such that each time the smart key cap is pressed after the application is loaded, a free coffee is loaded into the in-app checkout cart at no charge to the user, and the number of credits may be decremented accordingly in the smart key cap memory. In some aspects, credits can be "refilled" by an authorized person/entity. Any data can be stored in the memory (e.g., RFID tag) of the smart key cap, which can be relatively large (e.g., 2K bytes or more), and may include the smart key cap ID and a smart key function that can store credits, credentials, game data, services, licenses (e.g., number of times a user can open an application), macros, user settings/presets for an input device, or any suitable data, as would be appreciated by one of ordinary skill in the art with the benefit of this disclosure.

In some embodiments, a smart key cap may store multiple functions in its memory. For example, macros that combine two or more functions may be stored and executed by the host computer device when the smart key cap is pressed. In a typical embodiment, the macro can be a program code or reference code that is transferred to the input device when the key cap is pressed, and the input device and/or the host computing device can then determine an appropriate sequence for performing the multiple functions of the macro.

In certain embodiments, game data can be stored on the key function memory. For instance, a smart key cap may be preloaded with game weapon data, movement data, attribute data, or the like, and may be used with an FPS-style of game operating on the host computing device. Thus, a user can place movement keys, weapon keys, attribute keys, etc., in any suitable arrangement on a keyboard and customize their UX, which can be ported to any other compatible input device and placed in a similar fashion, or in a different arrangement in any manner.

In further embodiments, a smart key cap's identification data and function data can be changed by editing the editable data field (1342-1349) via a suitable input device, which can include a keyboard 1310, computer mouse 130, a smart phone application (e.g., RF, NFC, Bluetooth®, Wi-Fi, etc.), or the like.

In some embodiments, an image on the surface of the physical smart key cap can be changed by a user. For instance, the smart key cap may include a slot that allows a user to remove and install different graphical or textual images that may indicate the ID or function programmed in the smart key cap. The images can be printed on any suitable stationary of any size. In some cases, the key cap may include a display configured to depict an image associated with the key cap ID data. The display may be comprised of any suitable display technology, such as an LED display, e-ink display, or the like. In some aspects, the display may provide additional information to the user, such as a remaining number of credits for merchandise, recharge time for certain in-game abilities in gaming applications, or any suitable information, and it can be dynamically modified in real-time by the system, as would be appreciated by one of ordinary skill in the art with the benefit of this disclosure.

In certain embodiments, the wireless power transmitted by the reader (e.g., RFID, NFC, etc.) to the memory element (e.g., RFID tag) to read the smart key cap ID, function, etc., may be sufficient to power other additional features of the smart key cap, such as key cap displays (e.g., LED displays, e-ink displays), sensors (e.g., ambient light sensor, temperature sensor, biometric sensors (e.g., finger print, heart rate, etc.)), or other preferably low power consumption features, that are directly integrated inside of the keycaps. Sensor data from on-board sensors on the smart key cap can be transferred to the input device and/or the host computing device by communicating from the RFID tag to the RFID reader, as described above.

In some embodiments, the memory element (also referred to as a "memory structure") further stores operational data for the input device (e.g., keyboard 140) in a profile, where the operational data corresponds to one or more settings for an input element on the input device. Some examples of the one or more settings can include a dots-per-inch setting, a keyboard shortcut (e.g., to a web service or launch a program application on the host computing device), an RGB lighting setting, a roller resistance of a roller device, a click feedback profile for one or more buttons on the input device, a remapping function for one or more input elements on the input device, and the like, which can all be stored on the smart key cap and transferred to a different compatible input device to customize it as soon as the smart key cap is installed.

Figure 14:
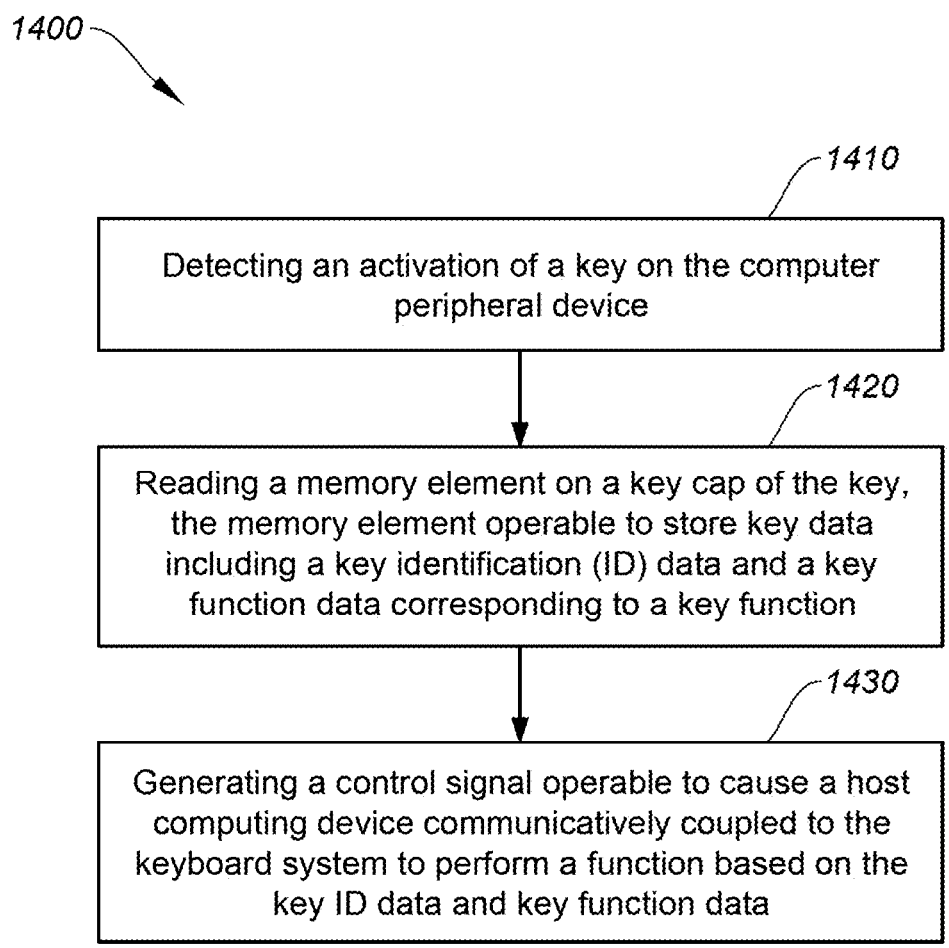
FIG. 14 is a simplified flow chart showing aspects of a method 1400 for operating a computer peripheral device with smart key structures, according to certain embodiments.

FIG. 14 is a simplified flow chart showing aspects of a method 1400 for operating a computer peripheral device with smart key structures, according to certain embodiments. Method 1400 can be performed by processing logic that may comprise hardware (circuitry, dedicated logic, etc.), software operating on appropriate hardware (such as a general-purpose computing system or a dedicated machine), firmware (embedded software), or any combination thereof. In certain embodiments, method 1400 can be performed by aspects of system 200, 300, 400, or a combination thereof.

At operation 1410, method 1400 can include detecting an activation of a key on the computer peripheral device, according to certain embodiments.

At operation 1420, method 1400 can include reading a memory element on a key cap of the key, the memory element operable to store key data including a key cap identification (ID) data and a key function data corresponding to a key function, according to certain embodiments.

At operation 1430, method 1400 can include generating a control signal operable to cause a host computing device communicatively coupled to the keyboard system to perform a function based on the key cap ID data and key function data, according to certain embodiments. In some embodiments, the key cap can include a transceiver circuit, wherein the reading of the memory element on the key cap is facilitated via wireless inductive coupling with the transceiver circuit, and wherein the reading of the memory element on the key cap is performed while the key is pressed. In some cases, the control signal controls the host computing device by causing the host computing device to update a visual representation of the keyboard on a display controlled by the host computing device, the visual representation of the keyboard including: a virtual keyboard with a virtual key cap, an editable data field that displays the key cap ID data of the key cap, and a second editable data field that display the key function data of the key cap, wherein the virtual key cap is shown to be placed on the virtual keyboard in a same corresponding location that the key cap is positioned on the keyboard, wherein changes to the key cap ID data in the editable data field causes a correspond change to the key cap ID data stored in the memory structure of the key cap, and wherein changes to the key function data in the second editable data field causes a correspond change to the key function data stored in the memory structure of the key cap. The key cap can be operable to wirelessly receive power from the transceiver circuit in the key body. In some embodiments, the key cap can include a display configured to depict an image associated with the key cap ID data, where the display is an LED display or an e-ink display, and where the display is powered by the wirelessly received power from the transceiver circuit in the key body. In some aspects, the key cap further comprises one or more sensors, where the one or more sensors are powered by the wirelessly received power, and the key cap transfers sensor data from the one or more sensors to the transceiver circuit. The one or more sensors include at least one of an ambient light sensor, temperature sensor, or a biometric sensor.

It should be appreciated that the specific steps illustrated in FIG. 14 provide a particular method 1400 for operating a computer peripheral device with smart key structures, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C # or C++, or any scripting language, such as Perl, Python or TCL, as well as combinations thereof. The server(s) may also include database servers, including without limitation those commercially available from Oracle®, Microsoft®, Sybase®, and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage transmitting, and retrieving computer-readable information. The system and various devices also typically will include a number of software applications, modules, services or other elements devices as well as storage media for temporarily and/or more permanently containing, storing, located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied. For example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A keyboard system comprising:
   a housing;
   a key structure disposed in the housing, the key structure including:

a key body including a transceiver circuit; and
a key cap configured to be non-destructively coupled to and decoupled from the key body, wherein the key cap includes and contains:
   a transceiver circuit; and
   a memory structure storing:
      a key cap identification (ID) data; and
      a key function data corresponding to a key function,
wherein the transceiver circuit is configured to poll the key cap memory structure via the transceiver circuit when the key cap is coupled to the key body and retrieve the key cap ID data and the key function data, and
wherein the keyboard system is configured to:
   determine a location of the key cap on the keyboard based on the polling of the key cap; and
   generate and transmit a control signal to a host computing device communicatively coupled to the keyboard system, the control signal corresponding to the key cap ID data and key function data.

2. The keyboard system of claim 1 wherein the key body includes a key switch with a key cap interface configured to couple to the key cap via at least one of a friction fit, magnetic coupling, or hardware coupling.

3. The keyboard system of claim 1 wherein the key structure further comprises a key cap holder configured between the key cap and the key body, the key cap holder configured to couple the key body to the key cap.

4. The keyboard system of claim 1 wherein the keyboard system includes a plurality of key structures each having corresponding key caps, and
wherein the transceiver circuit includes:
   one or more processors; and
   a global transceiver structure configured under the plurality of key structures within the housing, the transceiver circuit configured to poll each transceiver circuit in the corresponding key caps of the plurality of key structures via the global transceiver structure.

5. The keyboard system of claim 1 wherein the key structure includes a local transceiver circuit configured within or adjacent to the key body,
wherein the transceiver circuit is coupled to and controlled by one or more processors configured within the housing, and
wherein the transceiver circuit is configured to poll the transceiver circuit in the key cap via the local transceiver.

6. The keyboard system of claim 1 wherein the transceiver circuit is configured to poll the key cap memory structure when the key cap is pressed.

7. The keyboard system of claim 1 wherein the transceiver circuit is configured to poll the key cap memory structure when the key cap is unpressed at any time in order to detect a modified key cap ID data or a modified key function data.

8. The keyboard system of claim 1 wherein the transceiver circuit is operable to cause the data stored in the memory structure of the key cap to be modified.

9. A key cap for a key structure of an input device, the key cap comprising and containing:
a transceiver circuit; and
a memory structure operable to store:
   a key cap identification (ID) data; and
   a key function data corresponding to a key function,
wherein the key cap is configured to be coupled to a key body,
wherein the key cap is operable to communicate with a transceiver circuit in the key body via the transceiver circuit,
wherein the key cap is configured to transmit the key cap ID data and key function data to the transceiver circuit via the transceiver circuit, and
wherein the key cap is operable to instantiate the key function in a host computing device coupled to the input device when the key cap is depressed.

10. The key cap of claim 9 wherein the key cap ID data and key function data is configured to cause an input device to generate and transmit a control signal to a host computing device communicatively coupled to the input device, the control signal operable to control the host computing device based on the key cap ID data and key function data.

11. The key cap of claim 10 wherein the control signal controls the host computing device by causing the host computing device to:
update a visual representation of the input device on a display controlled by the host computing device, the visual representation of the input device including:
   a virtual input device with a virtual key cap;
   an editable data field that displays the key cap ID data of the key cap; and
   a second editable data field that display the key function data of the key cap, wherein the virtual key cap is shown to be placed on the virtual input device in a same corresponding location that the key cap is positioned on the input device,
wherein changes to the key cap ID data in the editable data field causes a correspond change to the key cap ID data stored in the memory structure of the key cap, and
wherein changes to the key function data in the second editable data field causes a corresponding change to the key function data stored in the memory structure of the key cap.

12. The key cap of claim 9 wherein the memory structure of the key cap is further operable to store credit data corresponding to an amount of available credits associated with the key cap, wherein when the key cap is depressed, the available credits stored in the memory structure is reduced by a predetermined amount.

13. The key cap of claim 9 wherein the key function data includes a plurality of functions stored as a macro in the memory structure of the key cap.

14. The key cap of claim 9 wherein the key cap is operable to receive power from the transceiver circuit in the key body via a wired or wireless power coupling, wherein the key cap includes a display configured to depict an image associated with the key cap ID data, wherein the display is an LED display or an e-ink display, and wherein the display is powered by the received power from the transceiver circuit in the key body.

15. The key cap of claim 9 wherein the memory structure further stores operational data for the input device in a profile, wherein the operational data corresponds to one or more settings for an input element on the input device, wherein the input device is a keyboard or a computer mouse, and wherein the one or more settings includes at least one of:
a dots-per-inch setting;
a shortcut;
an RGB lighting setting;
a roller resistance;
a click feedback profile;

a report rate setting;

a key assignment setting; or a power mode setting.

16. A method of operating a keyboard, the method comprising:

detecting, by one or more processors, an activation of a key on the keyboard;

reading, by the one or more processors, a memory element stored and contained by a key cap of the key, the memory element operable to store key data including:

a key cap identification (ID) data; and a key function data corresponding to a key function; and generating a control signal operable to cause a host computing device communicatively coupled to the keyboard to perform a function based on the key cap ID data and key function data.

17. The method of claim 16 wherein the key cap includes a transceiver circuit, wherein the reading of the memory element on the key cap is facilitated via wireless inductive coupling with the transceiver circuit.

18. The method of claim 16 wherein the control signal controls the host computing device by causing the host computing device to:

update a visual representation of the keyboard on a display controlled by the host computing device, the visual representation of the keyboard including:

a virtual keyboard with a virtual key cap;

an editable data field that displays the key cap ID data of the key cap; and a second editable data field that display the key function data of the key cap, wherein the virtual key cap is shown to be placed on the virtual keyboard in a same corresponding location that the key cap is positioned on the keyboard, wherein changes to the key cap ID data in the editable data field causes a correspond change to the key cap ID data stored in the memory element of the key cap, and wherein changes to the key function data in the second editable data field causes a corresponding change to the key function data stored in the memory element of the key cap.

19. The method of claim 17 wherein the key cap is operable to wirelessly receive power from the transceiver circuit, wherein the key cap includes a display configured to depict an image associated with the key cap ID data, wherein the display is an LED display or an e-ink display, and wherein the display is powered by the wirelessly received power from the transceiver circuit.

20. The method of claim 19 wherein the key cap further comprises one or more sensors, wherein the one or more sensors are powered by the wirelessly received power, wherein the key cap transfers sensor data from the one or more sensors to the transceiver, and wherein the one or more sensors include at least one of an environmental sensor, light sensor, biometric sensor, or a MEMS sensor.

* * * * *